US012647373B2

(12) United States Patent
Leyrer et al.

(10) Patent No.: US 12,647,373 B2
(45) Date of Patent: Jun. 2, 2026

(54) REAL-TIME, TIME AWARE, DYNAMIC, CONTEXT AWARE AND RECONFIGURABLE ETHERNET PACKET CLASSIFICATION

(71) Applicant: TEXAS INSTRUMENTS INCORPORATED, Dallas, TX (US)

(72) Inventors: Thomas Anton Leyrer, Geisenhausen (DE); William Cronin Wallace, Richardson, TX (US); Pratheesh Gangadhar Thalakkal Kottilaveedu, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/751,774

(22) Filed: May 24, 2022

(65) Prior Publication Data

US 2022/0286412 A1 Sep. 8, 2022

Related U.S. Application Data

(63) Continuation of application No. 16/425,734, filed on May 29, 2019, now Pat. No. 11,343,205.

(Continued)

(51) Int. Cl.
*H04L 49/25* (2022.01)
*G05B 19/4155* (2006.01)
(Continued)

(52) U.S. Cl.
CPC ........ *H04L 49/251* (2013.01); *G05B 19/4155* (2013.01); *H04L 43/16* (2013.01);
(Continued)

(58) Field of Classification Search
CPC ....... H04L 49/251; H04L 43/16; H04L 45/74; H04L 49/252; H04L 47/32; H04L 49/20;
(Continued)

(56) References Cited

U.S. PATENT DOCUMENTS 5,521,913 A * 5/1996 Gridley .................. H04L 12/56
370/428
6,938,197 B2 8/2005 Doubler et al.
(Continued)

FOREIGN PATENT DOCUMENTS

CN 103141058 A 6/2013

OTHER PUBLICATIONS

3GPP TS 29.272 V8.12.0 (Dec. 2012) 3rd Generation Partnership Project: Technical Specification Group Core Network and Terminals; Evolved Packet System (EPS); Mobility Management Entity (MME) and Serving GPRS Support Node (SGSN) related interfaces based on Diameter Protocol; Release 8; 77 pages.

(Continued)

*Primary Examiner* — Peter P Chau
(74) *Attorney, Agent, or Firm* — Kenneth Liu; Frank D. Cimino

(57) ABSTRACT

An ultra-high speed electronic communications device includes: a network communications interface; a memory; and one or more processing units, communicatively coupled to the memory and the network communications interface, wherein the memory stores instructions configured to cause the one or more processing units to: receive a data packet using the network communications interface; determine a classification of the data packet based, at least in part, on a plurality of factors, wherein the plurality of factors comprises a rate at which the data packet was received and a time at which the data packet was received; select, based at least in part, on the classification, an operation from a plurality of operations, wherein the plurality of operations comprises a cut-through operation and a store-and-forward operation; and perform the selected operation.

20 Claims, 8 Drawing Sheets

Related U.S. Application Data

(60) Provisional application No. 62/786,395, filed on Dec. 29, 2018, provisional application No. 62/677,878, filed on May 30, 2018.

(51) Int. Cl.
| | |
|---|---|
| *H04L 43/16* | (2022.01) |
| *H04L 45/74* | (2022.01) |
| *H04L 47/32* | (2022.01) |

(52) U.S. Cl.
CPC ............ *H04L 45/74* (2013.01); *H04L 49/252* (2013.01); *G05B 2219/33139* (2013.01); *H04L 47/32* (2013.01)

(58) Field of Classification Search
CPC .............. H04L 49/354; G05B 19/4155; G05B 2219/33139
See application file for complete search history.

(56)                  References Cited

U.S. PATENT DOCUMENTS

| | | | |
|---|---|---|---|
| 8,675,648 | B1 | 3/2014 | Goel et al. |
| 9,009,580 | B2 | 4/2015 | Sauber et al. |
| 9,313,140 | B2 | 4/2016 | Matthews |
| 9,325,449 | B2 | 4/2016 | Birrittella |
| 9,373,395 | B1 | 6/2016 | Augustine et al. |
| 10,601,713 | B1 | 3/2020 | Turgeman et al. |
| 2002/0083175 | A1 | 6/2002 | Afek et al. |
| 2002/0118640 | A1* | 8/2002 | Oberman ................ H04L 49/25 |
| | | | 370/389 |
| 2004/0066746 | A1 | 4/2004 | Matsunaga |
| 2005/0053081 | A1 | 3/2005 | Andersson et al. |
| 2005/0080953 | A1 | 4/2005 | Oner et al. |
| 2005/0271073 | A1* | 12/2005 | Johnsen ................ H04L 49/358 |
| | | | 370/428 |
| 2007/0091802 | A1 | 4/2007 | Pan et al. |
| 2008/0071924 | A1 | 3/2008 | Chilukoor |
| 2008/0091857 | A1 | 4/2008 | McDaniel |
| 2010/0329133 | A1 | 12/2010 | Hao et al. |
| 2011/0261814 | A1 | 10/2011 | Matthews |
| 2013/0177026 | A1 | 7/2013 | Soni et al. |
| 2014/0098816 | A1* | 4/2014 | Matthews ........... H04L 49/3027 |
| | | | 370/390 |
| 2014/0122560 | A1 | 5/2014 | Ramey et al. |
| 2014/0307740 | A1 | 10/2014 | Li et al. |
| 2014/0355619 | A1* | 12/2014 | Fukuda ............ H04L 12/40156 |
| | | | 370/428 |
| 2015/0071283 | A1 | 3/2015 | Hammond et al. |
| 2015/0078376 | A1 | 3/2015 | Wisehart |
| 2015/0078383 | A1 | 3/2015 | Wisehart |
| 2015/0304952 | A1 | 10/2015 | Coster et al. |
| 2016/0093351 | A1 | 3/2016 | Jung et al. |
| 2016/0093353 | A1 | 3/2016 | Jung et al. |
| 2016/0093354 | A1 | 3/2016 | Andre et al. |
| 2016/0315634 | A1 | 10/2016 | Mei et al. |
| 2016/0373362 | A1 | 12/2016 | Cheng et al. |
| 2017/0279712 | A1 | 9/2017 | Nainar et al. |
| 2017/0359268 | A1 | 12/2017 | Chan et al. |
| 2018/0077037 | A1 | 3/2018 | Zhang et al. |
| 2018/0343198 | A1 | 11/2018 | Stark et al. |
| 2019/0140979 | A1 | 5/2019 | Levi et al. |
| 2019/0207864 | A1* | 7/2019 | Taniguchi ............ H04L 1/0061 |
| 2019/0313285 | A1 | 10/2019 | Gottwerth |
| 2020/0099626 | A1* | 3/2020 | Yoneda ................ H04L 49/254 |
| 2021/0073619 | A1 | 3/2021 | Wang et al. |
| 2021/0110854 | A1 | 4/2021 | Ranjan et al. |
| 2021/0407986 | A1 | 12/2021 | Chien et al. |

OTHER PUBLICATIONS

3GPP TSG-SA WG1 Meeting #67; Sophia-Antipolis, France; Aug. 18-22, 2014; 4 pages.
First Chinese Office Action for CN 2019113629353 dated Aug. 26, 2023.

* cited by examiner

Figure 2C:
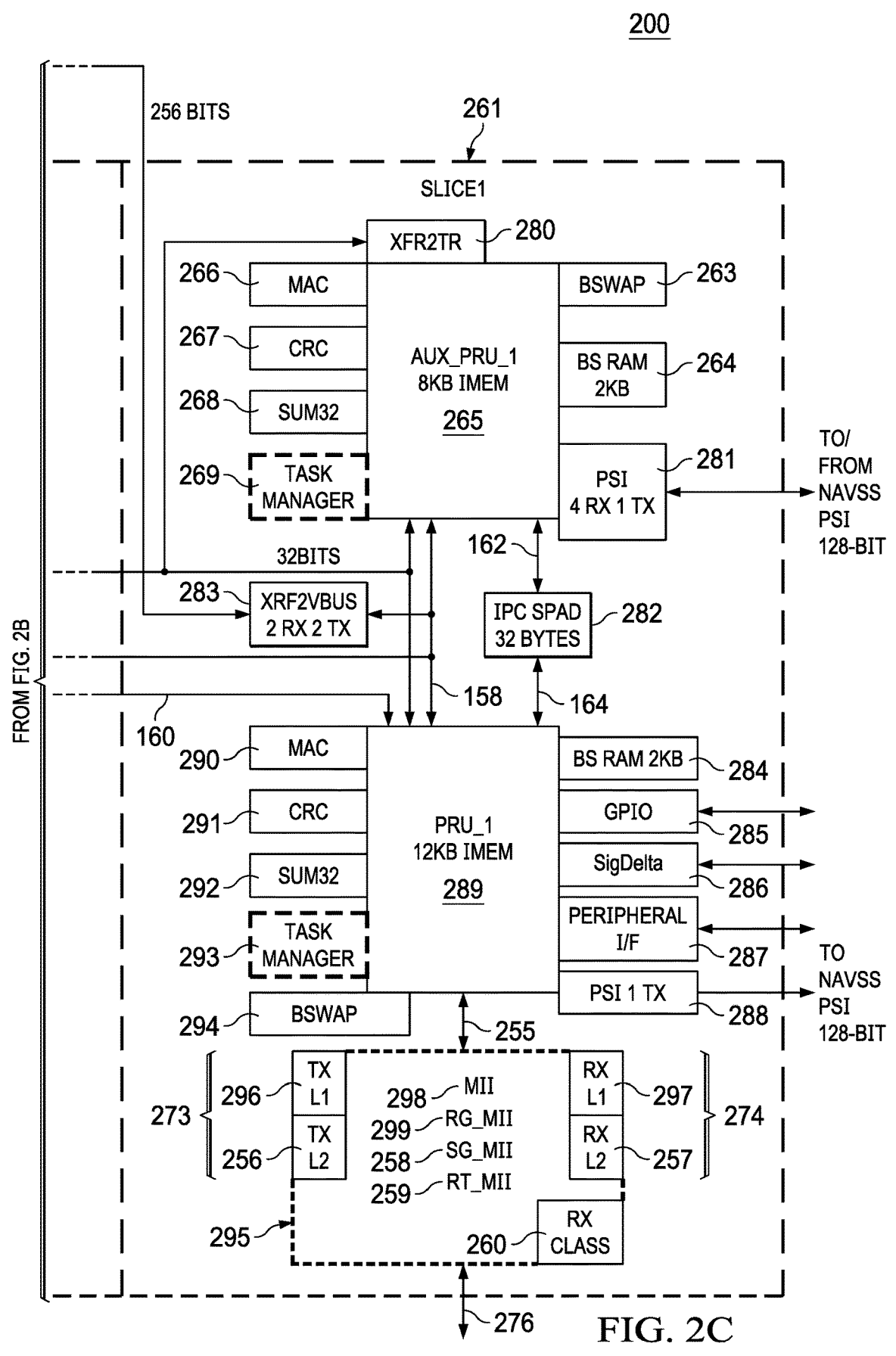

200

261

256 BITS

SLICE1

XFR2TR — 280

266 — MAC

267 — CRC

268 — SUM32

269 — TASK MANAGER

AUX_PRU_1
8KB IMEM
265

BSWAP — 263

BS RAM 2KB — 264

PSI 4 RX 1 TX — 281

TO/ FROM NAVSS PSI 128-BIT

32BITS

283 — XRF2VBUS 2 RX 2 TX

162

IPC SPAD 32 BYTES — 282

158

160

290 — MAC

291 — CRC

292 — SUM32

293 — TASK MANAGER

294 — BSWAP

PRU_1
12KB IMEM
289

164

BS RAM 2KB — 284

GPIO — 285

SigDelta — 286

PERIPHERAL I/F — 287

PSI 1 TX — 288

TO NAVSS PSI 128-BIT

255

273

296 — TX L1

256 — TX L2

298 — MII

299 — RG_MII

258 — SG_MII

259 — RT_MII

RX L1 — 297

RX L2 — 257

274

295

260 — RX CLASS

276

FROM FIG. 2B

REAL-TIME, TIME AWARE, DYNAMIC, CONTEXT AWARE AND RECONFIGURABLE ETHERNET PACKET CLASSIFICATION

CROSS-REFERENCE TO RELATED APPLICATIONS

This application is a continuation of U.S. patent application Ser. No. 16/425,734, filed May 29, 2019, which claims the benefit of U.S. Provisional Application No. 62/786,395, filed on Dec. 29, 2018, and the benefit of U.S. Provisional Application No. 62/677,878, filed on May 30, 2018, each of which is incorporated by reference herein in its entirety.

TECHNICAL FIELD

The present disclosure relates generally to an industrial control sub-system that can be formed as part of an integrated circuit, such as an embedded processor, a system on a chip (SoC), an application specific integrated circuit (ASIC), or a field programmable gate array (FPGA). More specifically, the present disclosure relates to real-time, data packet classification in an industrial control sub-system.

BACKGROUND

Many different communication protocols exist across different industries and market segments to address real-time communication for data exchange running on proprietary developed processing devices, such as SoCs, DSPs, ASICs and FPGAs. For example, there are more than one hundred communication protocols for the industrial market alone. Attempts to develop devices which can be readily configured to adapt to new communication protocols have not been wholly satisfactory. Hence, there is room for improvement in the art.

SUMMARY

At least one example of this disclosure includes a network communications interface; a memory; and one or more processing units, communicatively coupled to the memory and the network communications interface, wherein the memory stores instructions configured to cause the one or more processing units to: receive a data packet using the network communications interface; determine a classification of the data packet based, at least in part, on a plurality of factors, wherein the plurality of factors comprises a rate at which the data packet was received and a time at which the data packet was received; select, based at least in part, on the classification, an operation from a plurality of operations, wherein the plurality of operations comprises a cut-through operation and a store-and-forward operation; and perform the selected operation.

At least one other example of this disclosure includes a non-transitory computer-readable memory storing instructions executable by a processor, the instructions comprising instructions to: receive a data packet using a network communications interface; determine a classification of the data packet based, at least in part, on a plurality of factors, wherein the plurality of factors comprises a rate at which the data packet was received and a time at which the data packet was received; select, based at least in part, on the classification, an operation from a plurality of operations, wherein the plurality of operations comprises a cut-through operation and a store-and-forward operation; and perform the selected operation.

At least one further example of this disclosure includes a processor-implemented method, comprising: receiving a data packet using a network communications interface; determining a classification of the data packet based, at least in part, on a plurality of factors, wherein the plurality of factors comprises a rate at which the data packet was received and a time at which the data packet was received; selecting, based at least in part, on the classification, an operation from a plurality of operations, wherein the plurality of operations comprises a cut-through operation and a store-and-forward operation; and performing the selected operation.

BRIEF DESCRIPTION OF THE DRAWINGS

For a detailed description of various examples, reference will now be made to the accompanying drawings, in which:

FIGS. 2A-C illustrate an example industrial communication subsystem incorporating many components from FIG. 1;

DETAILED DESCRIPTION

Figure 1:
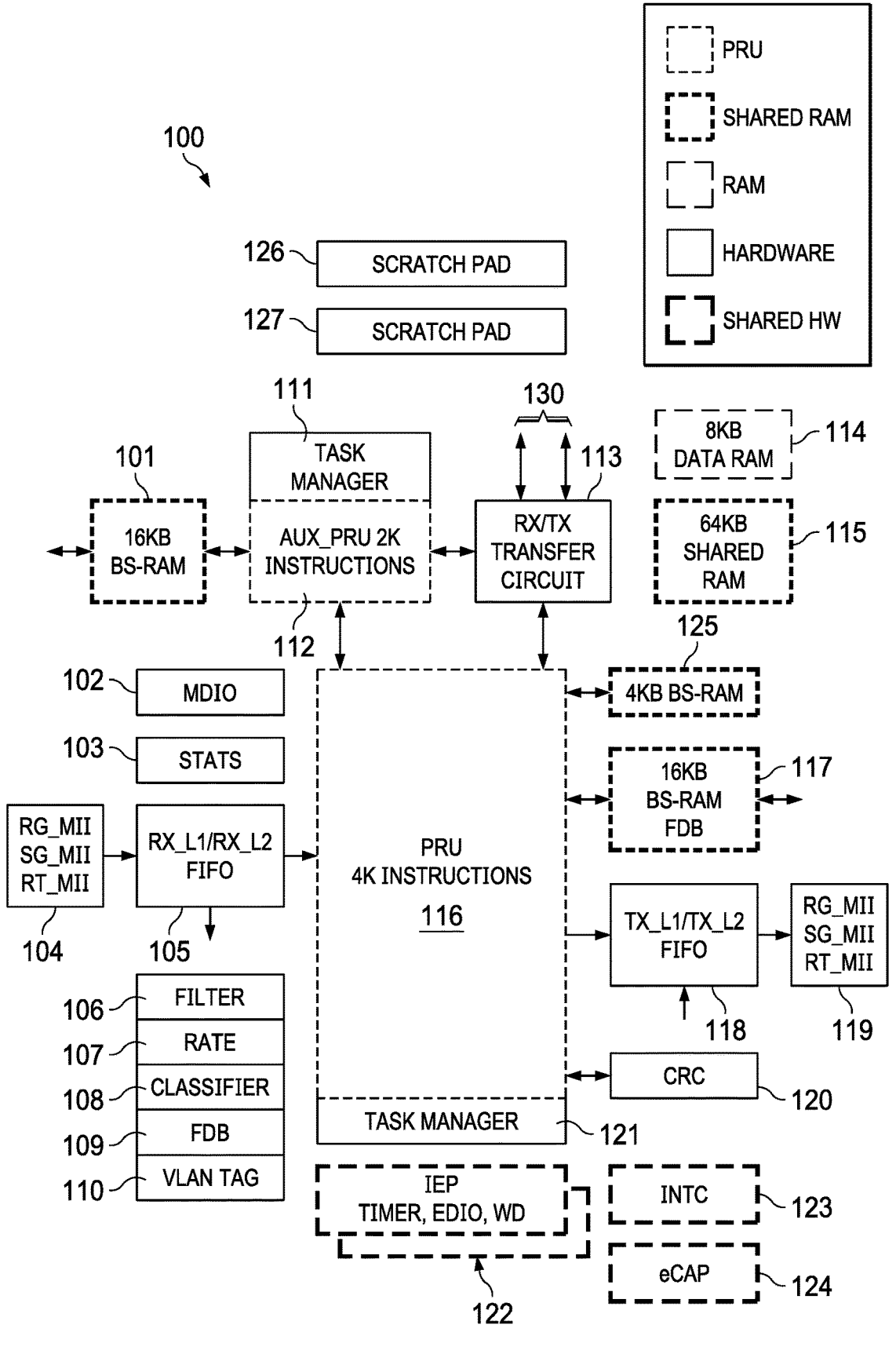
FIG. 1 illustrates a block diagram of an example of a system having an architecture in accordance with this disclosure.

In the following description, for purposes of explanation, numerous specific details are set forth in order to provide a thorough understanding of the examples disclosed herein. The disclosed example implementations may in some instances be practiced without these specific details. In other instances, structure and devices are shown in block diagram form to avoid obscuring the disclosed examples.

When introducing elements of various examples of the present disclosure, the articles "a," "an," and "the" are intended to mean that there are one or more of the elements. The terms "comprising," "including," and "having" are intended to be inclusive and mean that there can be additional elements other than the listed elements. The examples discussed are illustrative in nature and should not be construed to imply that the specific examples described herein are preferential in nature.

The examples described in this disclosure are neither mutually exclusive nor collectively exhaustive. References to "one example" or "an example" are not to be interpreted as excluding the existence of additional examples that also incorporate the recited features.

When used herein, the term "medium" includes one or more non-transitory physical media that together store the contents described as being stored thereon. Examples include non-volatile secondary storage, read-only memory (ROM), and/or random-access memory (RAM).

When used herein, the terms 'application' and 'function' include one or more computing modules, programs, processes, workloads, threads and/or a set of computing instructions executed by a computing system. Example implementations of applications and functions include software modules, software objects, software instances, other types of executable code, such as hard-coded programs, hardwired circuits, and/or hard-wired circuits.

One or more examples of this disclosure are implemented on a 'system on chip' (SoC). In at least one example, an SoC comprises multiple hardware components. In at least one example, an SoC comprises a microcontroller, a microprocessor, a digital signal processor (DSP) core, and/or a multiprocessor SoC having more than one processor core. In at least one example, an SoC comprises memory blocks including a selection of ROM, RAM, electrically erasable programmable read-only memory, and flash memory. In at least one example, an SoC comprises timing sources including oscillators and phase-locked loops. In at least one example, an SoC comprises peripherals including counter-timers, real-time timers and power-on reset generators. In at least one example, an SoC comprises analog interfaces including analog-to-digital converters and digital-to-analog converters. In at least one example, an SoC comprises voltage regulators and power management circuits.

In at least one example, an SoC includes both hardware, such as described above, and the software controlling the microcontroller, microprocessor or DSP cores, peripherals and interfaces in question.

When used in this disclosure, the term 'communication bridge' includes a computer networking device that creates a single aggregate network from multiple communication networks or network segments. This function is called network bridging. In real-time systems, such as those described herein, that utilize a communication bridge, the time allotted to forward packets is deterministic, with minimum jitter and latency. Forwarding decisions regarding incoming packets are dependent on the time at which a packet is received, the data rate at which a packet is received, and the content of the packet.

When used in this disclosure, the term 'jitter' refers to the deviation from true periodicity of a presumably periodic signal, often in relation to a reference clock signal.

In examples of this disclosure, a communication protocol is a system of rules that enables two or more entities of a communications system to transmit information. Certain communication protocols such as EtherCAT (Ethernet for Control Automation Technology) can have multiple datagrams within one packet which requires parsing the packet multiple times with variable start offset. EtherCAT is an Ethernet-based fieldbus system. A fieldbus system is an industrial network system for real-time distributed control. The EtherCAT protocol is standardized in IEC 61158 and is suitable for both hard and soft real-time computing requirements in automation technology. Profinet is an industrial ethernet communication protocol. Industrial ethernet systems like Profinent require their data packets to be parsed during receive process and make processing/forwarding decision—such as where to send a received packet—before the end of the packet has been reached during the receive process.

As noted, many different communication protocols have been developed across different industries and market segments to address real-time communication for data exchange running on proprietary developed processing devices, such as SoCs, DSPs, ASICs and FPGAs. Examples of this disclosure are directed towards providing and/or enabling multi-protocol flexibility for communication between such processing devices and/or components. At least one example of this disclosure is directed to providing and/or enabling real-time Ethernet communication at speeds of 1 Giga-bit/sec or faster.

At least one example of this disclosure is an architecture for an industrial communication subsystem (ICSS) which addresses the flexibility requirement of multi-protocol communications and the performance requirements of real-time gigabit Ethernet. With the integration onto catalog processors, the architecture makes industrial communication as easy as standard Ethernet. ICSS has a hybrid-architecture. In at least one example, ICSS includes four 32-bit reduced instruction set computer (RISC) cores called programmable real-time units (PRU) coupled with a set of tightly integrated hardware accelerators. Within this disclosure, hardware accelerators include hardware specially made to perform some functions more efficiently than would be possible using software running on a general-purpose central processing unit (CPU). A reduced instruction set computer (RISC) is a computer whose instruction set architecture (ISA) allows it to have fewer cycles per instruction (CPI) than a complex instruction set computer (CISC).

The combination of 128/256 gigabit/sec data transfer with deterministic programming resolution of four nanoseconds (ns) described herein is a highly differentiated approach to communication interfaces. A detailed view of the hardware accelerators in combination with 128/512 gigabit/sec data bus architecture is provided in FIGS. 2A-C.

Examples of this disclosure pertain to programmable real-time unit (PRU) subsystems and industrial communication subsystems (ICSS), consisting of dual 32-bit RISC cores (PRUs), data and instruction memories, internal peripheral modules, and an interrupt controller (INTC). The programmable nature of the PRU-ICSS, along with their access to pins, events and all SoC resources, provides flexibility in implementing fast real-time responses, specialized data handling operations, custom peripheral interfaces, and in offloading tasks from the other processor cores of the SoC.

For Industrial Ethernet use cases, example ICSSs of this disclosure provide a balance between programmability (flexibility) and the need to keep up with wire rate packet load. In at least one example, PRUs run based on a 250 MHz clock, and thus the firmware budget is in some instances limited to approximately 84 cycles per packet (for minimum size transmits and receive frames). This budget can be insufficient for full 802.1D compliant packet processing at 1 GHz rates. Hence, example ICSSs include hardware accelerators for time consuming bridging tasks, such as broadside (BS) 512-bit/1024-bit hardware accelerators and broadside random-access memory (BS-RAM).

A PRU microprocessor core, in accordance with disclosed examples, has a load/store interface to external memory. Using data input/output instructions (load/store), data may be read from or written to external memory, but at a cost of stalling the core while accessing occurs. Conventionally, a read of N 32-bit words typically takes 3+N cycles, while a write takes around 2+N cycles. These read and write rates are too slow for some applications, (e.g., reading 32 bytes can take around 11 cycles). Examples of this disclosure address these issues.

A PRU programmable core, in accordance with disclosed examples, also has a wide register load/store/exchange interface (referred to as broadside) that allows one cycle access to accelerators. A special set of instructions (xin/xout/xchng), that take a Broadside ID, the starting register for the transfer, and number of bytes to transfer as arguments, are used to by firmware to access this wide register interface. In at least one example of this disclosure, random-access memories (RAMs) are attached to this broadside interface. With this approach, firmware can transfer 32 bytes of data to or from RAM in fewer cycles than would otherwise be the case; typically taking 1-2 cycles for stores of 32 bytes and 2-3 cycles for loads of 32 bytes.

In at least one example, a broadside RAM and/or broadside interface is optimized for wide transfers of 32 bytes. Lower transfer widths can be supported by padding the size to 32 bytes. In at least one example, the read location is first written to an attached RAM using a xout broadside instruction, and then the data in question is read using a xin broadside instruction. Thus, read operations will always take two cycles. For write transfers, the address is placed in a register proximate the registers holding the 32 bytes of data, and the data plus address is transferred to the attached RAM in one xout instruction. In at least one example, this approach has the extra advantage of being able to also perform operations on the data, possibly in parallel with the transfer of the data.

In addition to speeding up writes by at least a multiple of ten in conventional systems and reads by a multiple of five for 32-byte transfers, examples of this disclosure provide advantages such as the ability of the broadside (BS) interface to locally store the RAM address last accessed by the BS interface, which allows for an auto-increment mode of operation so firmware does not have to constantly update the address (especially useful for bulk reads). Examples of this disclosure enable useful operations on data using this interface in parallel with write operations. For example, cut-through data can be run through a checksum circuit to compute a running checksum of a packet while the packet is stored in the RAM. In at least one example, a processor can perform endian flipping on data within a packet at various data size boundaries. In at least one example, a data pivot/swap operation can be performed using a BS interface, for example to swap registers r2-r5 with r6-r9. A data pivot/swap operation is useful when moving data between interfaces with different block sizes (e.g., from a 32-byte first-in-first-out (FIFO) receiver (RX) FIFO to a 16-byte packet streaming interface). In at least one example, by using a different BS identifier (ID) (a parameter to a broadside instruction) to associate an organization to the attached memory or to enable independent memory 'views' by different firmware tasks. The broadside IDs can map to different read or write memory addresses (maintained by glue logic) so that data structures, such as first-in-first-out (FIFO), and queues can be implemented by the attached RAM in a flexible and firmware managed manner. At least one example utilizes embedded processing.

In at least one example of this disclosure, ingress filter hardware in combination with an ingress classifier enables hardware decisions for real-time forwarding and processing.

In an example of this disclosure, multiple hardware filters can be combined with binary logic to form a complex receive decision matrix. In an example, multiple hardware filters can be combined with a time window for time aware receive decisions. Multiple hardware filters can also be combined with rate counters for rate-limited receive decisions.

In at least one example of this disclosure, a hardware filter and classifier enables receive and forwarding decisions relating to packets with minimum bridge delay. In an example, a combination of content, time window and data rate provides a robust ingress classification for Ethernet bridging while maintaining minimum bridge delay. Examples of this disclosure enable bridge delays of less than a microsecond.

FIG. 1 is a functional block diagram of a system 100 (which can be a component of a SoC 130) based on ICSS architecture in accordance with one example of this disclosure. In FIG. 1, a 16-Kilobyte broadside random-access memory (BS-RAM) 101 is coupled to (in signal communication with) AUX_PRU 112. The BS-RAM 101 is coupled to the PRU 116 via AUX_PRU 112. BS-RAM 101 can transfer 32 bytes of data in one clock cycle of the system 100. BS-RAM 101 has an ultra-high bandwidth and ultra-low latency. Within this disclosure, coupled components (e.g., circuits) are able to communicate with each other. Connected components are those which are coupled via a direct connection or an indirect connection. Within this disclosure, components which are coupled to one another are also connected, unless an indication to the contrary is provided.

As illustrated in FIG. 1, data coming in through interface circuit 104 (which is a real-time interface) is passed to FIFO receive circuit 105. As data goes through the receive circuit 105, classifier 108 is applied to this incoming data. The filter 106, the rate counter 107, and combinational logic of classification engine 108 are applied to received data packets.

Management data input/output (MDIO) circuit 102 is a media interface. MDIO circuit 102 uses PRU 116 to communicate with an external reduced gigabit media-independent interface (RGMII) physical layer and a media-independent interface (MII) physical layer, (interface circuit 104, interface circuit 119). MDIO circuit 102 has low latency and is dedicated to PRU 116. As shown in FIG. 1, the system 100 also includes a statistics counter circuit 103, which tracks statistics of the Ethernet ports of real-time interface circuit 104, such as packet sizes, errors, etc. Real-time interface circuit 104, comprising RGMII, serial gigabit media-independent interface (SGMII), and real-time media-independent interface 231, 259 (RTMII) is a hardware layer which connects to the input/outputs (IOs) of system 100, such as MDIO circuit 102. Real-time interface circuit 104 is coupled to FIFO receive circuit 105, which includes a level one first-in-first-out (FIFO) receiving layer (RX_L1) and a level two FIFO receiving layer (RX_L2). FIFO receive circuit 105 can receive level one FIFO data and level two FIFO data.

As noted, system 100 includes filter 106, which is a filter for eight filter type 1 data streams and/or sixteen filter type 3 data streams. Filter 106 determines whether a given data packet is a particular "type" of data packet. Filter type 3 data packets have a variable start address depending on whether packets are communicated with a virtual LAN. System 100 also includes a rate tracker 107. In at least one example, the system 100 includes eight rate trackers 107. Based on a filter type hit rate, rate tracker 107 calculates the throughput rate of FIFO receive circuit 105. The system 100 also includes filter database (FDB) 109. FDB 109 is used for routing and redundancy. Receive circuit 105 includes a level one receiving layer (RX_L1) and a level two receiving layer (RX_L2), which include physical receive ports. Level one receiving layer (RX_L1) and level two receiving layer (RX_L2) of receive circuit 105 can access FDB 109 to manage receiving and forwarding decisions based on an IEEE802.1Q learning bridge mode 1. FDB 109 contains a lookup table (LUT) storing results which can be given to PRU 116 to assist PRU 116 in making data routing decisions. In at least one example, system 100 also includes virtual local area network tag (VLAN TAG) circuit 110. (A tag (a/k/a 'ID') is a keyword or term assigned to a piece of information (such as an Internet bookmark, digital image, database record, computer file, or VLAN). Statistics tracker 103, filter 106, rate tracker 107, classifier 108, FDB 109, and (optionally) VLAN TAG 110 are aspects of receive circuit 105.

MDIO circuit 102 controls interaction with the external physical layer (not shown) of the system in accordance with the open systems interconnection (OSI) model. The physical layer connects a link layer device such as medium access controller (MAC) (see 206 (266) and 220 (290) of FIG. 2A, and 266 and 290 of FIG. 2C) to a physical medium of a host (e.g., 246) device/system of which the subsystem 200 is a component or to which the subsystem 200 is coupled. The physical layer includes both physical coding sublayer (PCS) functionality and physical medium dependent (PMD) layer functionality. There is a transceiver external to the SoC 130 in which system 100 is embedded. The MDIO circuit 102 configures one or more external physical layers (not shown) and serves to minimize latency of the ICSS.

Every central processing unit (CPU), such as programmable real-time unit 116 includes a task manager circuit (e.g., task manager circuit 111). In at least one example, task manager circuit 111 and task manager circuit 121 can recognize 200 events or more. Events correspond to hardware status signals such as from the filter 106, from the rate tracker 107, or from interrupt controller 123. AUX_PRU 112 is responsible for control. For instance, based upon a starter frame, PRU-RTU 112 detects that a new packet is going to the data processor—PRU 116—and, in parallel to the data processor's collecting the data, PRU-RTU 112 will set up the address and direct memory access (DMA) per packet as needed for the packet to go to the host (130, 246). While data is being pushed to the BS-RAM 117, the data can also be pushed to a checksum accelerator such as CRC 120. Thus, CRC 120 can hang of off BS-RAM 117. Transfer circuit 113 communicates with AUX_PRU 112 and PRU 116. Transfer circuit 113 can receive (RX) and transmit (TX) information, as indicated by the notation 'RX/TX' in FIG. 1. Transfer circuit 113 is configured with DMA, which enables both AUX_PRU 112 and PRU 116 to access main system 100 memory. When AUX_PRU 112 or PRU 116 initiates a transaction, transfer circuit 113 will manage data movement to SoC 130 memory to either pull or push data. Transfer circuit 113 is thus a general asset that can be used for data transfers. In at least one example, in the architecture of FIG. 1, the AUX_PRU 112 can control address location while the PRU 116 pushes data. Thus, the architecture is flexible in that a single CPU e.g., (112, 116) is not responsible for both data management and control functions.

In at least one example subsystem 100, there exists a fabric having local memory. The fabric in the example subsystem 100 of FIG. 1 can be 4-byte wide. There are however, two banks of data memory 114 dedicated to each CPU (e.g., 112, 116), and another bank of larger memory 115 is shared across CPUs (112, 116). Data memory 114 can be used with scratchpad 126 and scratchpad 127, while shared memory 115 is used for a link-list which is used for DMA or for storing metadata. A scratchpad 126, 127 is like BS-RAM 101, 117. Scratchpad 126 and scratchpad 127 are different from BS-RAM 101 and BS-RAM 117 however, in that scratchpads 126, 127 are shared amongst slices (see slice_0 of FIG. 2A and slice_1 of FIG. 2C) and, scratchpads 126, 127 are more flexible than BS-RAM 101,117. A scratchpad (e.g., 126, 127) can save and/or restore a register set. Scratchpads 126, 127 can be used for slice to slice communication and to perform barrel shifting or remapping of a register set to a physical location. BS-RAM 117 is similar to BS-RAM 101 except BS-RAM 117 also has a FDB which includes a look up table. When a packet comes in enters system 100 at receive circuit 105, hardware performs a look up to FDB 109 and presents the data to the PRU 116. Based on the response of the FDB of BS-RAM 117, the PRU 116 makes a routing decision, such as whether to route the received packet to the host via transfer circuit 113 and/or to a different port, such as through transmit circuit 118. PRU 116 also accesses BS-RAM 125. PRU 116 acts as a switch, while BS-RAM 117 enables actions to be performed concurrently. BS-RAM 117 is thus a dual use component. Hardware can be connected to the BS-RAM 117 while the BS-RAM 117 performs look ups to the FDB 109 for the PRU 116. Just as a check sum can be performed by CRC 120 at the same time RAM (e.g. 114) is being loaded, while the BS-RAM 125 is interacting with hardware, an FDB operation can be performed by BS-RAM 117 for PRU 116.

Transmit circuit 118 handles the egress of data from the PRU 116. Transmit circuit 118 performs preemption, tag insertion, and padding. Transmit circuit 118 enables firmware to terminate a packet cleanly. Thereafter task manager circuit 121 will perform the necessary steps to generate a final CRC and the transmit circuit 118 will perform padding if the packet in question is small. The transmit circuit 118 can insert a tag so that PRU 116 does not have to keep track of the packet. The transmit circuit 118 is thus able to assist the hardware of the SoC 130. The transmit circuit 118 is coupled to interface circuit 119. Interface circuit 119 is a final layer. External to transmit circuit 118 there exist different media independent interfaces, for example RGMIIs, SGMIIs, and real-time MIIs (see 104, 119, 225 (295)). Other types of interfaces on the system 100 are also possible within this disclosure. FIFO transmit circuit 118 is agnostic with respect to such interfaces. Interface circuit 119 is a de-multiplexer. Interface circuit 119 provides protocol conversion for transmit circuit 118, enabling transmit circuit 118—and hence PRU 116—to communicate with a given piece of hardware in a protocol which is suitable for that hardware. PRU 116 and transmit unit 118 are thus not constrained to operating in a manner which corresponds to only one protocol, making PRU 116 and transmit circuit 118 more versatile than they would be absent interface circuit 119. In at least one example of this disclosure, the system 100 pins down data streams of interface circuit 119 to connect to an external physical layer. Transmit circuit 118 has a level one FIFO transmit layer (TX_L1) and a level two FIFO transmit layer (TX_L2), referring to levels of the open systems interconnection (OSI) model. Level (or 'layer') one corresponds to the physical layer of the OSI model and level two corresponds to a data link layer of the OSI model. This dual layer connectivity provides options. For example, the level two FIFO transmit layer (TX_L2) can be bypassed and data can be sent to the level one FIFO transmit layer (TX_L1), which reduces latency. In at least one example, the level two FIFO transmit layer (TX_L2) has a wider interface than does the level one FIFO transmit layer (TX_L1). In at least one example, the level two FIFO transmit layer (TX_L2) has a 32-byte interface, whereas the level one FIFO transmit layer (TX_L1) has a 4-byte interface. In at least one example, if at the receive circuit 105 a data packet goes from level one receiving layer (RX_L1) to the level two receiving layer (RX_L2) 272 (257), and the PRU 116 accesses the packet at the level two receiving layer (RX_L2), the data will be pushed to the level two FIFO transmit layer (TX_L2) of FIFO transmit circuit 118 first, and then the hardware of FIFO transmit circuit 118 will push the data packet directly to the level one FIFO transmit layer (TX_L1). However, when communicating with ultra-low latency interfaces such as EtherCAT, the level two FIFO transmit layer (TX_L2) can be bypassed; the data that is output from PRU 116 can be pushed directly to level one FIFO transmit layer (TX_L1), (which, as noted, has a 4-byte width).

Interface circuit 104 and interface circuit 119 are at level zero of the OSI model. Data thus enters system 100 at level zero through interface circuit 104, is moved from level zero to either level one receiving layer (RX_L1) of FIFO receive circuit 105 or level two receiving layer (RX_L2) 272 (257) of FIFO receive circuit 105, to the PRU 116, (which exists at both level one and level 2), and from level one or level two of PRU 116 through the FIFO transmit circuit 118 and back down to level zero at interface circuit 119. In at least one example, cyclical redundancy check (CRC) circuit 120 is an accelerator which assists PRU 116 perform calculations. The PRU 116 interfaces with the CRC circuit 120 through BS-RAM 117. The CRC circuit 120 applies a hash function to data of the PRU 116. The CRC circuit 120 is used to verify the integrity of data packets. For example, all Ethernet packets include a CRC value. The CRC circuit 120 performs a CRC check on a packet to see if the CRC value of the packet agrees with the result calculated by the CRC circuit 120. That is, a packet includes a CRC signature and after the signature is calculated, the result is compared with the signature that is attached to the packet to verify the integrity of the packet.

System 100 also includes interrupt controller (INTC) 123. INTC 123 aggregates and CPU (e.g., AUX_PRU 112, PRU 116) level events to host (e.g., 130, 146) events. There may be, for example, ten host events. INTC 123 determines that a given set of slave level events should be aggregated, mapped, and classified down to a single entity. The single entity can be routed to and used by the PRU 116 or the task manager circuit 121 to cause an event for the host (130, 146). In that sense, INTC 123 is both an aggregator and a router.

Enhanced/external capture (eCAP) circuit 124 is a timer which enables PRU 116 to generate an output response based upon a time match with industrial Ethernet peripheral (IEP) circuit 122, and captures event time for events external to system 100.

IEP circuit 122 has two sets of independent timers which enable time synchronization, time stamping, and quality of service for egress of data out of system 100. There are several independent capture circuits associated with IEP circuit 122. For example, if there is a receive (RX) starter frame event and it is important the frame be pushed to the host at a specific time, the IEP circuit 122 can time stamp the event to indicate that specific time. If the event is a time triggered send for the egress circuit 118, if it is desirable to transfer a packet at a precise time (within 2-3 nanoseconds), transmission of the packet begins when the timer expires, independent of the PRU 116. Thus, the transfer of the packet is effectively decoupled from the PRU 116.

In addition to the timers described, IEP circuit 122 also contains enhanced digital input/output interfaces (EDIO). An EDIO is similar to a general-purpose input/output (GPIO) interface, but is more intelligent and better calibrated for Ethernet communications. For example, a transmit-started or receive-started frame might cause an event on the EDIO which can in turn cause an event external to the SoC 130. Sync-outs and latches-in are part of time synchronization. It is also possible for IEP 120 to receive a frame and capture an analog voltage. In conventional systems this would require a read operation. But with EDIO, a capture can be event triggered and/or time triggered, thus making capture more precise than in conventional systems. The EDIO enables the system 100 to determine with precision when an incoming frame arrives, which in turn enables the system 100 to sample one or more specific values (such as temperature, voltage, etc.) and track with precision when a sample was taken because of time stamping by the IEP circuit 122. The frame in question can be augmented. When the frame is transmitted by transmit circuit 118 the frame can contain the time-stamped sampled value without leaning overhead or latency. IEP circuit 122 also includes a watch dog (WD) timer. Certain events should occur under normal operating conditions. When such events occur, the PRU 116 will normally clear the WD timer. If the WD timer fires that means the PRU 116 did not clear the WD timer in time, or did not reset the WD timer in time, which indicates there was a stall or some type of latency that was not expected. The WD timer thus serves to track errors.

As noted, task manager circuit 111 and task manager circuit 121 can recognize a great number of events. PRU 116 is the main data engine of system 100. When a frame is started, the system 100 begins preparing and servicing receiving circuit 105. Once a frame is in transmit circuit 118, inputting of the next packet can begin. Because the PRU 116 is the main processor, the PRU 116 needs to have access to all events in real-time. Another operation associated with PRU 116 is watermarking. A watermark can be created at interface circuit 105, receive circuit 105, transmit circuit 118, and interface circuit 119. It is undesirable too wait until the FIFO is full before loading or unloading packets because that would be too late, and it is undesirable to wait until the FIFO is empty because that would be too early, when a certain amount of emptiness (or fullness) is reached, task manager circuit 121 can fire, and the PRU 116 will determine whether the packet will be watermarked.

An aspect of the BS-RAM 117 is that it enables PRU 116 to snoop the packet at the same time the system 100 can save contexts and variables at the BS-RAM 117 and operations can be performed on the contexts and variables with no overhead costs because the data of the packet does not need to be moved twice. In at least one example of this disclosure, an incoming data packet can be moved to a storage location and at the same time the data is operated upon. This differs from conventional systems which move an incoming packet to a processing circuit and subsequently to a storage location. The system 100 thus performs a single operation where a conventional system would perform two.

As noted, AUX_PRU 112 interacts with BS-RAM 101. AUX_PRU 112 has a task manager circuit 111 which can preempt PRU 116 based on the occurrence of certain events or context swaps. AUX_PRU 112 also interacts with transfer circuit 113. In at least one example, a system 100 in accordance with this disclosure also includes eight kilobytes of data RAM 114 and 64 kilobytes of shared RAM 115. AUX_PRU 112 and transfer circuit 113 both interact with PRU 116. Task manager circuit 121 enters real-time tasks for receive and transmit processing based on FIFO watermarks. PRU 116 is also coupled to 16-kilobyte BS-RAM filter database 117. Output from PRU 116 goes to FIFO transmit circuit 118. In turn, output from FIFO transmit circuit 118 goes to real-time interface circuit 119. PRU 116 also interacts with CRC 120, which calculates checksums inside an ethernet packet. In at least one example, system 100 includes IEP/timer/EDIO/WD circuit(s) 122. As noted, the system 100 can also include interrupt controller (INTC) 123 and eCAP circuit 124.

Figure 2A:
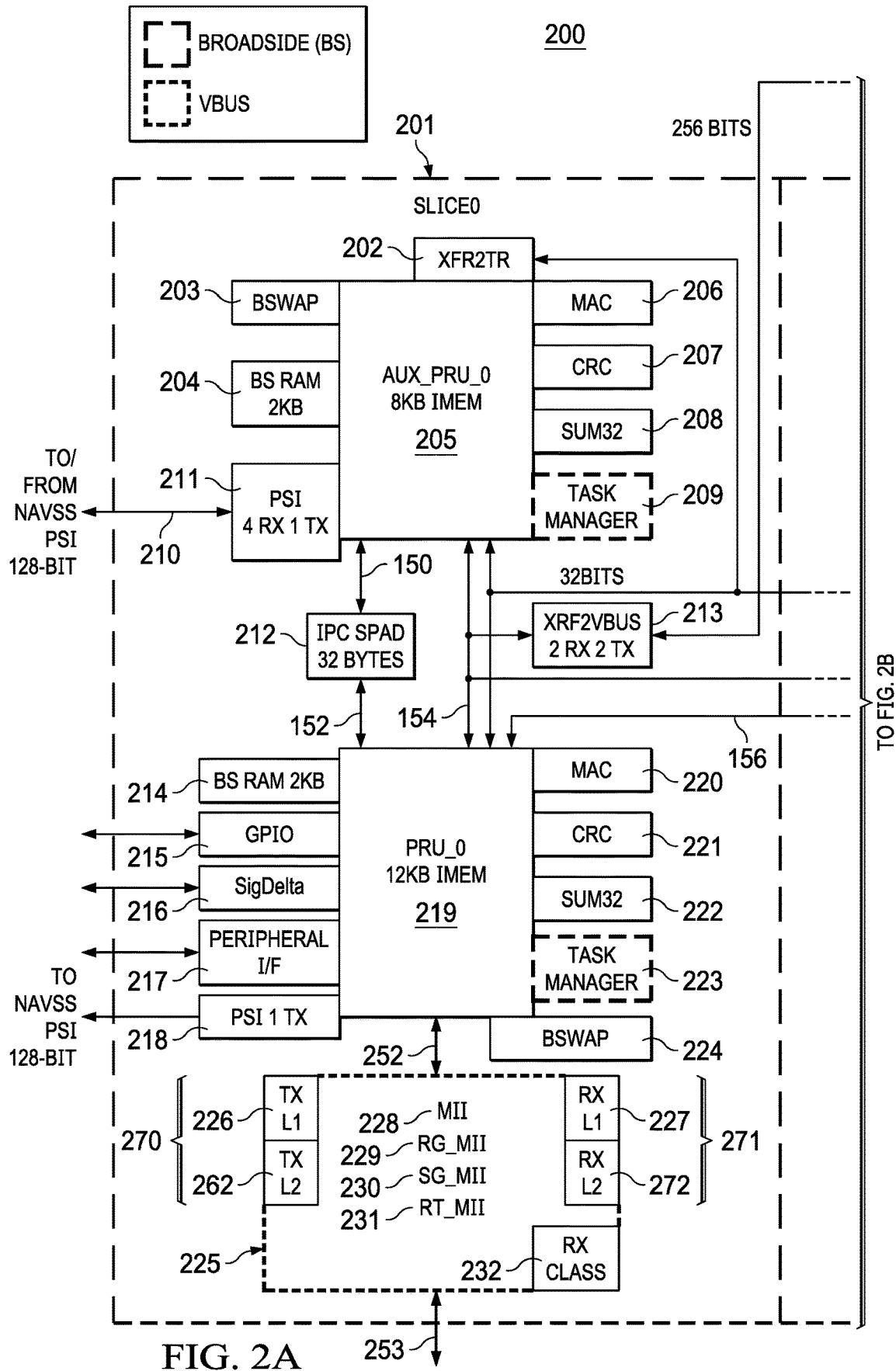
Figure 2B:
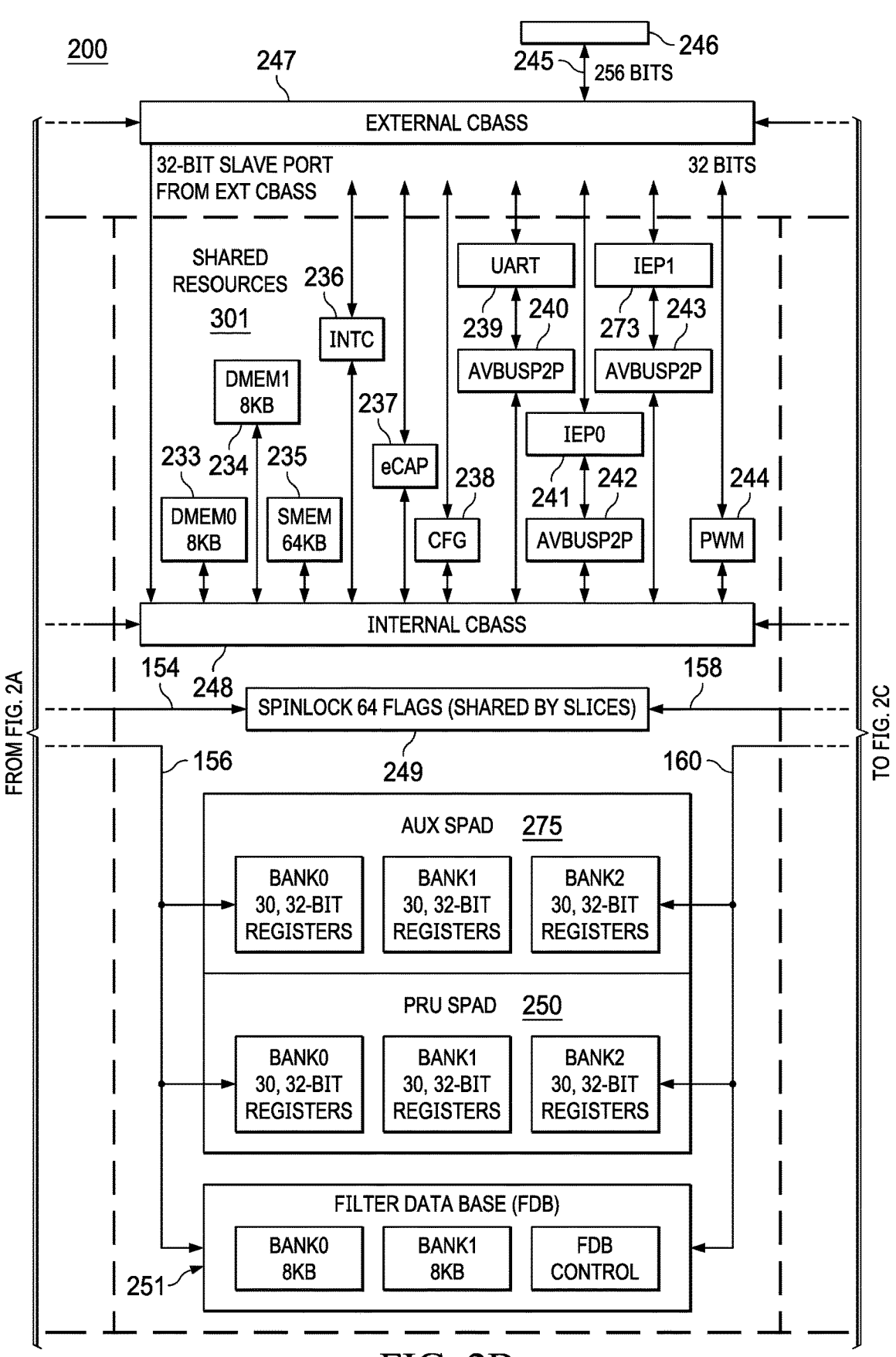

FIGS. 2A-C illustrate an example industrial communication subsystem (ICSS) (hereinafter simply subsystem 200). FIGS. 2A-C illustrate many of the same components as shown in FIG. 1, but in varying detail. Descriptions set forth regarding FIG. 1 are germane to FIGS. 2A-C, and vice versa. Slice_0 201, on the left of internal bus 248 and external bus 247, is symmetrical to slice_1 261 on the right. (Note, like alphabetical designations indicate like components.) Descriptions of components in slice_0 201 apply to their counterparts in slice_1 261. As illustrated in FIG. 2, subsystem 200 includes processing hardware elements, such as auxiliary programmable real-time unit (AUX_PRU_0) 205 and PRU_0 219 which contain one or more hardware processors, where each hardware processor may have one or more processor cores. In at least one example, the processor (e.g., AUX_PRU_0 205, PRU_0 219) can include at least one shared cache that stores data (e.g., computing instructions) that are utilized by one or more other components of the processor (AUX_PRU_0 205, PRU_0 219). For example, the shared cache can be a locally cached data stored in a memory for faster access by components of the processing elements that make up the processor (AUX_PRU_0 205, PRU_0 219). In some cases, the shared cache can include one or more mid-level caches, such as a level 2 cache, a level 3 cache, a level 4 cache, or other levels of cache, a last level cache, or combinations thereof. Examples of processors include, but are not limited to a CPU microprocessor. Although not explicitly illustrated in FIG. 2, the processing elements that make up processor AUX_PRU_0 205 and processor PRU_0 219) can also include one or more other types of hardware processing components, such as graphics processing units, ASICs, FPGAs, and/or DSPs. Another accelerator of PRU_1 is BSWAP circuit 224 (294). BSWAP circuit 224 (294) can swap words depending on the size of the packet in question, little endian and/or big endian. BSWAP circuit 224 (294) can re-order of the bytes in a packet, depending on the word size.

Subsystem 200 includes slice_0 201 which is mirrored by slice_1 in FIG. 2C. As can be seen in FIG. 2A, slice_0 201 has multiple components. The main components are auxiliary PRU (AUX_PRU_0) 205, PRU_0 219 and MII 25. AUX_PRU_0 205 has a number or accelerators (a/k/a widgets). AUX_PRU_0 205 serves as the control processor of slice_0 201. Throughout this disclosure, the terms 'control processor,' 'AUX_PRU,' and 'RTU_PRU' are synonymous and interchangeable unless indicated otherwise or dictated by the context in which they appear, though their functions and configurations can differ.

FIG. 2A illustrates that memory (e.g., 204 (264)) can be operatively and communicatively coupled to AUX_PRU_0 205. Memory 204 (264) can be a non-transitory medium configured to store various types of data. For example, memory 204 (264) can include one or more storage devices which comprise volatile memory. Volatile memory, such as random-access memory (RAM), can be any suitable non-permanent storage device. In certain instances, non-volatile storage devices (not shown) can be used to store overflow data if allocated RAM is not large enough to hold all working data. Such non-volatile storage can also be used to store programs that are loaded into the RAM when such programs are selected for execution.

Software programs may be developed, encoded, and compiled in a variety of computing languages for a variety of software platforms and/or operating systems and subsequently loaded and executed by AUX_PRU_0 205. In at least one example, the compiling process of the software program may transform program code written in a programming language to another computer language such that the AUX_PRU_0 205 is able to execute the programming code. For example, the compiling process of the software program may generate an executable program that provides encoded instructions (e.g., machine code instructions) for AUX_PRU_0 205 to accomplish specific, non-generic computing functions.

After the compiling process, the encoded instructions can then be loaded as computer executable instructions or process steps to AUX_PRU_0 205 from storage 220 (290), from memory 210, and/or embedded within AUX_PRU_0 205 (e.g., via a cache or on-board ROM). In at least one example AUX_PRU_0 205 is configured to execute the stored instructions or process steps to perform instructions or process steps to transform the subsystem 200 into a non-generic and specially programmed machine or apparatus. Stored data, e.g., data stored by a storage device 220 (290), can be accessed by AUX_PRU_0 205 during the execution of computer executable instructions or process steps to instruct one or more components within the subsystem 200.

FIG. 2B illustrates component and resources shared by slice_0 of FIG. 2A and slice_1 of FIG. 2C. FIG. 2C comprises the same hardware as FIG. 2A. Slice_0 201 and slice_1 261 are symmetrical about FIG. 2B. Descriptions within this disclosure pertaining to FIG. 2A apply mutatis mutandis to FIG. 2C. Subsystem 200 include subsystem 200 also includes at slice_0 201 and a corresponding port 276 on slice_1 261. There is a third port (see FIG. 130), host port 245, the host port 245 connects subsystem 200 to the host 246, of which subsystem 200 can be a component. Port 253 and port 276 can both be connected to the Ethernet. Subsystem 200 can thus serve as a three-port switch. Host 246 can be a local source/sync or a SoC (130). While subsystem 200 option can be an SoC (130) in and of itself, in some implementations, subsystem 200 will be a subcomponent of a greater SoC (130). The host 246 will, in some examples, be a CPU from ARM Holdings PLC of Cambridge, England, UK. In at least one example, host 246 comprises several CPUs. There is exist a variety of CPUs. An example of a small CPU is the Arm Cortex-R5-CPU. An example of a large CPU is the Arm Cortex-A57-CPU. In at least one example subsystem 200 can be controlled by another such CPU.

Subsystem 200 includes as shown, XFR2TR circuit 202 (FIG. 2A) interacts with internal configurable bus array subsystem (CBASS) 248 (FIG. 2B). The 'XFR' in XFR2TR circuit 202 (280) stands for transfer. XFR2TR circuit 202 (280) has a broadside interface. XFR2TR circuit 202 (280) is abutted to AUX_PRU_0 205 via the broadside interface of the XFR2TR circuit 202 (280). Internal register sets of the AUX_PRU_0 205 are exposed to accelerators MAC 206, CRC 207 (267), SUM32 circuit 208 (268), byte swap (BSWAP) circuit 203 (263), and BS-RAM 204 (264). In at least one example subsystem 200 of this disclosure, internal register sets of AUX_PRU_0 205 are directly exposed to accelerators such as those referenced above, differs from the architectures of conventional systems. In conventional systems a load-store operation over the fabric would be required for the AUX_PRU_0 205 to access an accelerator. In the example shown in FIG. 2, however, the accelerators are—in effect—part of the data path of AUX_PRU_0 205. The AUX_PRU_0 205 can import and export its register files to a given accelerator (a/k/a 'widget') based upon a given register's broadside ID. For example, XFR2TR circuit 202 (280), which is part of a DMA, can perform a transfer request. A transfer request (TR) can begin with a start address to start data movement a designation of the amount of data to be moved (for example, 200 bytes). XFR2TR circuit 202 (280) can perform a simple DMA memory copy of SMEM 235 which contains a list of predetermined transfer requests (TRs). Software running on AUX_PRU_0 205 is aware of the list of preexisting TRs of SMEM 235. In operation, AUX_PRU_0 205 sends an instruction to a DMA engine to move data. Since transfer instructions can be extremely complicated and/or complex, predefined instructions reside within a 'work order pool' stored in SMEM 235. Based on the type of packet in question, AUX_PRU_0 205 determines which 'work orders' should be used, and in what sequence, to cause the packet to be sent to the correct destination. The XFR2TR circuit 202 (280) can create a work order list as directed by AUX_PRU_0 205, and once the work order list is created, the XFR2TR circuit 202 (280) will notify a DMA engine (not shown). The DMA engine will then pull the designated work orders from SMEM 235 and execute the pulled work orders. The XFR2TR 202 (280) thus minimizes the computational overhead and transfers necessary to build a DMA list, like a link list to perform the data movement. TR stands for transfer request.

Another accelerator of AUX_PRU_0 is BSWAP circuit 203 (263). BSWAP circuit 203 (263) can swap words depending on the size of the packet in question, little endian and/or big endian. BSWAP circuit 203 (263) can re-order of the bytes in a packet, depending on the word size. BSWAP circuit 203 (263) is thus an accelerator which will automatically perform such swaps. BS-RAM 204 (264) corresponds to the BS-RAM 101 discussed regarding FIG. 1. BS-RAM 204 (264) is tightly coupled to AUX_PRU_0 205. When the AUX_PRU_0 205 pushes data element to BS-RAM 204 (264), a CRC for that element can be calculated simultaneously by CRC 207 (267) or a checksum for the data element be calculated simultaneously by checksum circuit 208. Based upon the data packet's ID, the AUX_PRU_0 205 will snoop for the necessary transaction(s), (for example checksum, multiply, accumulate, etc.) concurrently, meaning that pushing the data element to BS-RAM 204 (264) and performing an accelerator action constitute a single transaction rather than a double transaction. This simultaneity of operations is enabled by the BS-RAM 204 (264) in that BS-RAM 204 (264) can enable and/or disable the functions of the widgets while data is being transferred to physical RAM (for example, data RAM 114 and shared RAM 115 shown in FIG. 1).

Peripherals BSWAP 203 (263), XFR2TR circuit 202 (280), MAC 206 (266), CRC 207 (267), and SUM32 208, while illustrated as external to BS-RAM 204 (264) for explanatory purposes, will, under most operating conditions, be embedded within BS-RAM 204 (264). Multiplier-accumulator (MAC) 206 (266) is a simple accelerator comprising a 32-bit by 32-bit multiplier and a 64-bit accumulator. Cyclic redundancy check (CRC) circuit 207 (267) performs redundancy checks cyclically. CRC circuit 207 (267) supports different polynomials. Checksum circuit 208 is like CRC circuit 207 (267) except that checksum circuit 208 uses a hash operation to determine the integrity of a payload at AUX_PRU_0 205 before performing a checksum on the payload.

Task manager circuit 209 is a key part of AUX_PRU_0 205. Task manager circuit can prompt AUX_PRU_0 205 to execute a given function based on which of the 196 events is detected.

There are two ways that data can be moved in and out of the subsystem 200 and to and from SoC 130 memory and/or to an external device. One way is through the packet streaming interface (PSI) 211 (281), which provides the ability to push data to a host (e.g., 246) and to pull data from the host (e.g., 246). This action of PSI 211 (281) is unlike a read request. Rather the master (writer) component of PSI 211 (281) is attached to AUX_PRU_0 205. There is a mapping of received packets to a destination. The destination, under normal operating conditions, will be ready to receive the packets. For that reason, PSI 211 (281) does not read data, but instead transmits data to a destination endpoint. PSI 211 (281) receives data from and sends data to navigation subsystem (NAVSS) 210. NAVSS 210 enables complex data movement. NAVSS 210 has a DMA engine and an advanced TR called a re-engine. NAVSS 210 supports PSI 211 (281) and can map PSI 211 (281) to other devices, such as via peripheral component interconnect express. Using PSI 211 (281), data can go directly from ICSS to peripheral component interconnect express while bypassing the host and/or a main DMA engine, enabling streaming data from one Ethernet interface (for example, interface circuit 225 (295)) and to another interface such as a universal serial bus or peripheral component interconnect express.

AUX_PRU_0 205 communicates with inter-processor communication scratch pad (IPC SPAD) 212 (282), which in turn also communicates with PRU_0 219. IPC SPAD 212 (282) is not a temporary SPAD that is owned by a single CPU. In at least on the purpose of IPC SPAD 212 (282) is to be able to transfer data or full controller status across AUX_PRU_0 205 and PRU_0 219. Transfer-to-virtual-bus circuit (XFR2VBUS) circuit 213 (or simply 'transfer circuit 213') corresponds to the transfer circuit 113 shown in FIG. 1 and operates in the same way as transfer circuit 113. Transfer circuit 213 (283) is attached to BS-RAM 214 (284). Transfer circuit 213 (283) has a broadside interface with external CBASS 247, internal CBASS 248, and spinlock circuit 249. Transfer circuit 213 can request reads and writes from memory (e.g., 204, 214) to broadside, and from broadside to memory. This read/write function is different from a read/write operation such as at dedicated memory (DMEMO) 233. A conventional DMA copy operation would move information in SoC (130) memory to DMEMO 233 or to shared memory SMEM 235. The internal CBASS 248 is the network-on-chip for subsystem 200.

Internal CBASS 248 is 4-bytes wide. In at least one to access internal CBASS 248, a load and store operation must be performed, which is a high latency low throughput operation. However, using the tightly coupled and more direct transfer circuit 213 (283) reduces latency and overhead, while also providing greater bandwidth because of the broadside width of transfer circuit 213 (283). Thus, transfer, circuit 213 (283) can act as a direct map from register files to subsystem 200 memory (e.g., 233). Intermediate memory locations are bypassed and transfer circuit 213 (283) goes directly to a register file, which reduces latency.

As noted like AUX_PRU_0 205, PRU_0 219 also has accelerators. PRU_0 219 corresponds to PRU 116 of FIG. 1. As with PRU 116, PRU_0 219 has a task manager circuit 223. The primary difference between AUX_PRU_0 205 and PRU_0 219, is that PRU_0 219 interacts with interface circuit 104, receive circuit 105, transmission circuit 118 and interface circuit 119 (see FIG. 1), which are shown collectively in FIGS. 2A-C as interface circuit 225 (295). Interface circuit 225 (295) includes receive circuit 270 which includes level one FIFO transmit layer (TX_L1) 226 (296), and level two transmit layer (TX_L2) 262 (256) (see FIG. 1, 118). Transmit circuit 270 includes level one receiving layer (RX_L1) and level two receiving layer (RX_L2) 272 (257) (see 105, FIG. 1).

BS-RAM 214 (284) of PRU_0 219 of AUX_PRU 205 is the same as BS-RAM 204 (264). General purpose input/output (GPIO) circuit 215 (285) enables subsystem 200 to have access to additional hardwires of the SoC (e.g., 130, 246). Sigma-Delta circuit 216 (286) is an analog to digital converter which interacts with one or more external sensors (not shown). Sigma-Delta circuit 216 (286) converts a stream of analog data from the sensors to a stream of digital data. Sigma-Delta circuit 216 (286) is a filter. The data stream from the sensors corresponds to voltage or temperature at an external device such as a motor. Sigma-Delta circuit 216 (286) informs PRU_0 219 of certain events, for example if there is a spike in current, a spike in voltage, or a spike in temperature. PRU_0 219 determines what action, if any, needs to be taken because of the spike.

Peripheral interface 217 (287) is used for detecting a position or orientation of a device under control of subsystem 200, such as a motor or robotic joint. Peripheral interface 217 (287), for example, uses a protocol to determine the precise radial position of an arm. Sigma-Delta circuit 216 (286) and peripheral interface 217 (287) are thus used for device control, such as robotic control. Sigma-Delta circuit 216 (286) and peripheral interface 217 (287) are tightly coupled to the PRU_0 219, which enables subsystem 200 to be useful in industrial scenarios.

Packet streaming interface PSI 218 (288) of 219 is like PSI 211 (281) of 205 PSI. 211 (281) and PSI 218 (288) interact with navigation subsystem (NAVSS) PSI 210. However, while PSI 211 (281) has four receive (RX) inputs and one transmit (TX) output, PSI 218 (288) has a single transmit (TX) output. As noted, PRU_0 219 can move the register file of PRU_0 219 directly into the Ethernet wire (port) 253. Thus, a data packet enters through level one receiving layer (RX_L1) 227 of receive circuit 271 and level two receive layer (RX_L2) 272 (257) of receive circuit 271; there is no requirement to read memory or to go through DMA. Instead, the data packet can be immediately popped (pushed) to PRU_0 219 in a single data cycle. If necessary, the data packet can be pushed to level one transmit layer (TX_L1) 226 (296) or level two transmit layer (TX_L2) 262 (256) in the next clock cycle, which can be called a 'bridge-to-layer-cut-through' operation. In at least one a bridge-to-layer-cut-through operation is faster than a store and forward operation. The bridge-to-layer-cut-through operation can be performed while the data packet is pushed to the host 246 (for example, an SoC 130) via PRU_0 219 and port 245, or to slice_1 261, as the case dictates.

PRU_0 219 is a RISC CPU whose register file has access to an Ethernet buffer without the need to access or go through other memory. Interface 228 (298), interface 229 (299), and interface 230 (258) are physical media interfaces and include at least one RGMII. Real-time media independent interface 228 (298) is a 4-bit interface. Interface 229 (299) is a Giga-bit wide. Interface 229 (299) is a reduced Giga-bit media interface (RGMII). Interface 230 (258) is a serial Giga-bit media independent interface (SGM II). In one or more examples of these identified interfaces perform in real-time.

Ethernet interface circuit 225 (295) includes receive (RX) classifier circuit 232 (108) which takes rate data (107) and filter data (106) and other data, and based upon a predefined mapping function such as a time function, the classifier circuit 232 (108) classifies packets according to this mapping function. The packet's classification will determine the priority of the packet, which will dictate into which queue the packet will be placed (high priority queue, low priority queue, etc.). Port 253 of interface circuit 225 (295) is essentially a wire dedicated to the ethernet interface circuit 225 (295). Port 253 is at level zero of the OSI model. Interface 252 (255) is the interface between PRU_0 219 and ethernet interface circuit 225 (295). As noted, transmit circuit 270 (273) and receive circuit 271 (274) are FIFO-configured circuits. FIFO transmit circuit 270 (273) corresponds to transmit circuit 118 of FIG. 1, and FIFO receive circuit 271 (274) corresponds to circuit 105 in FIG. 1. The classifier circuit 232 operates on data while the data is pushed into FIFO circuit 270 (273).

Slice_0 201 and slice_1 261 share a number resources 301, such as illustrated in FIG. 2B. Slice_0 201 and slice_1 261 are coupled to each other via internal CBASS 248. Internal CBASS 248 is coupled to interrupt controller 236. Interrupt controller 236 is an aggregator that aggregates instances of events (recall there are 196 possible events). Some of the events can come from the host (130) 246, though most of events are internal to subsystem 200. Because there are a large number possible events, events must be aggregated or consolidated into a smaller number of super-packets for sharing with the data from a host (e.g., 246) at large. Software running on PRU_0 219 determines the mapping of source to an output destination.

As noted, subsystem 200 includes internal configurable bus array subsystem (CBASS) 248 as a shared resource. Internal CBASS 248 receives data from external CBASS 247 via a 32-bit slave port. Internal CBASS 248 communicates with dedicated memory_0 233, dedicated memory_1 234, and shared memory (SMEM) 235 (115). SMEM 235 is a general-purpose memory. SMEM 235 can be used for direct memory access (DMA) operations, for DMA instruction sets, and other functions. DMA is like a scratchpad (126, 127), and can contain control and state information. Internal CBASS 248 also communicates with enhanced capture module (eCAP) 237, which also communicates with external configurable bus array subsystem (CBASS) 247. Enhanced capture module 237 is a timer used for time management an external device, such as a motor.

In at least subsystem 200 has different modes of operation. AUX_PRU_0 205 and PRU_0 219 each have a memory mapped register. The host 246 will write information to the configuration manager circuit 238. If, for example, the host 246 needs to enable RGMII mode, the configuration manager 238 will enable RGMII 229 (299), which is an example of a configuration register.

Universal asynchronous receiver-transmitter (UART) 239 is a hardware device for asynchronous serial communication in which the data format and transmission speeds are configurable. The electric signaling levels and methods are handled by a driver circuit external to the UART 239. UART must operate at a specific baud-rate, which requires a fixed clock rate. Asynchronous bridge (AVBUSP2P) 240 communicates with internal CBASS 248 and UART 239. UART 239, in turn, communicates with external CBASS 247. AVBUSP2P 240 is a bridge which allows for independent clocking of UART 239. External CBASS 247 is coupled to industrial Ethernet peripheral_0 (IEP0) 241A and industrial Ethernet peripheral_1 (IEP1) 241B. IEP0 241 and IEP1 273 each include a timer, an EDIO, and a WD (122). IEP0 241A and IEP1 241B jointly enable two time-domain managements to run concurrently. The eCAP 237 timers search for timer of IEPO and IIP2 must operate on a given frequency (for example 200 megahertz), but the PRU can be decoupled from these. Likewise, if necessary, AVBUSP2P 240, AVBUSP2P 242, and AVBUSP2P 243 are couplers which allow the UART 239, IEP0 241A and IEP1 241B to operate at different frequencies.

As shown in FIG. 2B, there is a second AVBUSP2P circuit 242 is communicatively interposed between IEP0 241A and internal configurable bus array subsystem (CBASS) 248. There is also a third AVBUSP2P 243 communicatively interposed between IEP1 241B and internal CBASS 248. The subsystem 200 also includes pulse width modulator (PWM) 244, which is communicatively interposed between internal CBASS 248 and an external component.

Components 236, 237, 238, 239, 241A, 241B and 244 each connect to a specific SoC wire. That is, they each communicate with IOs of host 246.

FIG. 2B also shows that subsystem 200 can include spinlock 249, AUX_SPAD 250, and PRU_SPAD 275. Spinlock 249 is a hardware mechanism which provides synchronization between the various cores of subsystem 200 (for example, 205, 219) and the host 246. Conventionally, a spinlock is a lock which causes a thread trying to acquire it atomically to simply wait in a loop ("spin") while repeatedly checking if the lock is available. Since the thread remains active but is not performing a useful task, the use of such a lock is a kind of busy waiting. Once acquired, spinlocks will usually be held until they are explicitly released, although in some implementations they can be automatically released if the thread being waited on (that which holds the lock) blocks, or "goes to sleep". A lock is a synchronization mechanism for enforcing limits on access to a resource in an environment where there are many threads of execution. A lock enforces a mutual exclusion concurrency control policy. Based on this principle, spinlock 249 provides for automaticity for operations of subsystem 200 components. For example, spinlock 249 enables each of the subsystem's cores (e.g., AUX_PRU_0 205) to access a shared data structure, such as a data structure stored in SMEM 235, which ensures that the various cores are updated at the same time. The access of the various cores is serialized by spinlock 249.

As shown in the example subsystem 200, auxiliary scratchpad (PRU SPAD) 250 and AUX SPAD 275 each hold three banks of thirty 32-bit registers. Subsystem 200 also includes a filter data base (FDB) 251 (109), which comprises two 8 kilobyte banks and a filter data base control circuit. FDB 251 is a broadside RAM that is accessed by AUX PRU_0 205 and PRU_0 219. FDB 251 is also accessible by the hardware engine Sigma-Delta 216 (286) and peripheral interface 217 (287). Receive circuit 271 (which includes level one receiving layer (RX_L1) 227 (297) and level two receiving layer (RX_L2) 272 (257) can also access FDB 251. FDB 251 is a broadside RAM with respect to AUX PRU_0 205 and PRU_0 219 to read and write entries, but the hardware also uses FDB 251 to provide an accelerated compressed view of packets arriving through port 253. The hardware will consult memory of FDB 251 using a hash mechanism and deliver the result to PRU_0 219 along with the packet. Determining where the packet goes next is a routing function. AUX PRU_0 205 and PRU_0 219 access FDB 251 via the broadside interface of FDB 251 to add information and to delete information. The receive hardware 225 (295) can also access FDB 251.

Subsystem 200 can also include communications interfaces 225 (295), such as a network communication circuit that could include a wired communication component and/or a wireless communications component, which can be communicatively coupled to processor 205. The network communication circuit 225 can utilize any of a variety of proprietary or standardized network protocols, such as Ethernet, TCP/IP, to name a few of many protocols, to effect communications between devices. Network communication circuits can also comprise one or more transceivers that utilize the Ethernet, power line communication Wi-Fi, cellular, and/or other communication methods.

As noted, in examples of this disclosure, data packets are processed in a real-time deterministic manner, unlike in conventional Ethernet or IEEE Ethernet processing, which defines more of a 'best efforts' traffic system in which packet loss occurs depending on the load of a given network. While conventional Ethernet management is acceptable for many applications, such as video streaming, in industrial settings, (for example, a robotic assembly line) sent data packets are (under ideal conditions) are delivered accurately and according to a predetermined schedule. In the industrial world packets must come according to a rigorous schedule. Of course, packet loss can occur in industrial environments but there are different means in layers (higher than level 0, level 1 and level 2 to which examples of this disclosure pertain) to take care of packet loss.

When a packet is received at level one receiving layer (RX_L1) 227 and/or level two receiving layer (RX_L2) 272 (257) from the physical layer (not shown), packet classifier 232 (108) analyzes the packet and identifies which portion of the packet is content (a/k/a 'payload'). The packet classifier (a/k/a 'packet classification engine') 232 then makes an on the fly decision regarding what to do with that packet. Ethernet bridge 225 (295) makes forwarding-and-receive decisions regarding each packet received (via receive circuit 271 and/or portal 253). In a conventional IEEE Ethernet bridge, such forwarding-and-receive operations are performed in a 'store and forward manner,' in which an incoming data packet is received in a first step, and once the data packet has been received, the content is then examined in a second step. In a conventional IEEE Ethernet bridge, once the packet is fully received and the content examined, a third step forwarding-and-receive determination is made. After the forwarding-and-receive determination is made, the data packet is then provided to a mechanical transmission layer, (such as via transmission element 226 (296). In at least one example of this disclosure, these steps are streamlined in a manner that minimizes latency and jitter. In at least one example, the classification engine 232 (260) is configured to perform the procedures of a conventional IEEE Ethernet bridge in an overlapping manner whereby by the time a packet has been completed received at receive circuit 271 (272) the classification engine 232 (260) has already determined what needs to be done with the packet, to what destination the packet needs to be sent, and by what route.

In examples of this disclosure, bridge delay is the amount of time between when a data packet arrives at a port 253 and goes out on another port 276. During the time between the ingress of the data packet and the egress of the data packet, there is, as noted the subsystem 200 makes a switching decision (determination) and then executes a transmit function. In the standard Ethernet IEEE world, the switching function is executed using a store and forward architecture which necessarily has a variable latency. Under variable latency conditions, there is no guarantee that when a data packet is received at time zero on the incoming port 253 (104, 105) that the data packet will go out at a fixed (known a priori) time on a different port (e.g., 276, 245). At least one benefit of subsystem 200 is that the classification engine 232 makes it possible to know that if a data packet is received at time zero, the packet will be sent out through another port (e.g., 245), within a predetermined (deterministic) period. In at least one example, this period is one microsecond. In at least one example, when a component, (such as slice_0 201), has such a short switching time, that component is deemed a real-time component, able to perform its assigned functions in 'real-time'. In examples of this disclosure, real-time computing (RTC) describes hardware and software systems subject to a "real-time constraint", for example from event to system response. For example, real-time programs must guarantee response within specified time constraints (a/k/a 'deadlines'). In some examples within this disclosure, real-time responses are in the order of milliseconds. In some examples within this disclosure, real-time responses are in the order microseconds.

Examples of this disclosure pertain to communication bridges which operate in real-time system. A communication bridge is a real-time control system in which input data and output data are exchanged in a deterministic manner. Examples of this disclosure include a control device (e.g., 217 (287), 244) and multiple slave devices (not shown) or devices (not shown) which consume the input/output data from the control device 217 (287), 244 in real-time. The real-time system 100, 200 has a communication bridge 255 real-time capability. Thus, the amount of time to forward packets is deterministic, with minimum jitter and latency. In at least one example, jitter and latency are minimized (to range of a few nanoseconds) by a hardware timer (not shown) which defines the time when a packet leaves a physical port 253, 252 (255). The real-time operability of subsystem 200 is different from standard Ethernet, in which jitter of at least tens of microseconds is common. In such conventional systems, the amount of time taken to make forwarding/routing determinations varies in accordance with when a packet arrives, the rate at which the data packet is received, and the content of the packet. In a real-time system (e.g., 200) of this disclosure, there is a cyclic execution of switching functions. For example, new data can be exchanged in the subsystem 200 every 31 microseconds. A predetermined exchange rate (such as 31 microseconds) serves as a time reference. Depending on when a packet comes in (via port 253, for example), the packet is either forwarded with the deterministic latency (in this example, 31 microseconds), or alternately, the data packet is handled according to a store and forward manner, like that described above for conventional systems. Thus, packet arrival time can be a discriminator for how a given data packet will be treated by the subsystem 200. Another factor taken into consideration by receive (RX) classifier 232 in determining what to do with an incoming packet is the data (transmit) rate normally associated with the type of packet in question. For example, if the average data rate of for a received packet if it exceeds a certain data rate threshold, the system can drop (less consequential) data packets to help ensure that there is enough bandwidth for higher priority packets. In at least one example, classifier 232 determines how important a given data packet is based, at least in part, on the packet's payload.

In at least one example, the classifier 232 examines packet content by first accessing a location in the packet, such as the packet's Ethernet media access control (MAC) address. A MAC address of a device is a unique identifier assigned to a network interface controller (NIC) for communications at the data link layer of a network segment. MAC addresses are used as a network address for most IEEE 802 network technologies, including Ethernet, Wi-Fi and Bluetooth. In at least one example, MAC addresses are used in the medium access control protocol sublayer of subsystem 200. In accordance with this disclosure MAC addresses are recognizable as six groups of two hexadecimal digits, separated by hyphens, colons, or using other notational systems.

Data packets can be filtered by filter 106 based on their designated delivery address (not shown). A data packet includes a six-byte source and destination address. In at least one example, interface circuit 225 (295) filters (106) packets based on that information. For example, interface circuit 225 (295) could read the packet's network address and determine whether to accept the packet, forward the packet or drop the packet. In at least on example, an accept-forward-drop decision can be based on a MAC header of the packet. In at least one example, in making an accept-forward-drop determination, an interface circuit can go further into the packet to the payload, and make filtering 106 determinations based on names which are in the payload. In some implementations of SoC 200, names of devices are connected in the payload, and then the content filter 106 looks at the payload.

In implementations of this disclosure, data packets will often contain multiple datagrams. This multiplicity of datagrams requires passing the packet, or portions thereof, to multiple addresses. Put another way, there can be multiple sub-packets in an Ethernet packet. Since the sub-packets can each have their own address, the addresses must be parsed. In situations where there are multiple addresses in one packet and the subsystem 200 will restart parsing each time a sub-address is detected. Thus, interface circuit 225 (295) will have a variable start offset for filters 106 to enable interface circuit 225 (295) to place multiple sub-packets in a single Ethernet packet. In at least one example, this means that sub-packets derived from a single data packet are sent to different devices (e.g., through peripheral interface 217 (287)); in examples of this disclosure, a single Ethernet packet can contain sub-packets, on or more of which are intended for (addressed to) different devices. Unless otherwise indicated, communications (packet exchange) of this disclosure are not point-to-point communications. Communications of this disclosure are based on a master device to slave device architecture. In implementations of this disclosure, a single master device (such as host 246 for example) controls tens, hundreds, or even thousands of slave devices.

Because of this asymmetrical relationship between master device and slaves, (1 to N, where N can be an extremely great number), and the requirement that communications occur in real-time, interface circuit 225 (295), which includes ingress filter hardware 106 is provided. The ingress filter 106, (and its attendant logic), in combination with ingress classifier 232 enables a hardware decision for real-time forwarding and processing. In examples of this disclosure, all of the information which must be read in order for a forward and receive determination to take place regarding a packet is located in the first 32 bytes in the packet. Once the first 32 bytes of that are read, PRU_0 219 can look up headers and additional headers, depending on the protocol with which the packet complies. The headers can be looked up (such as in filter data base 251) in real-time. Thus, once interface circuit 225 (295) has received the first 32 bytes of the packet, the interface circuit 225 (295) has sufficient information to determine whether to forward the packet, or whether to receive the packet, as described above. It should be noted that the 32-byte header size described is an example header size. Systems 100, 200 of this disclosure can be configured to work with packets that have other header sizes.

As noted, (packet) receive processing is done in real-time. In implementations of this disclosure, AUX_PRU_0 205, PRU_0 219, and interface circuit 225 (295) are programmable, and are configured such that all packet processing is completely deterministic. Receiving the 32 bytes of header information is done in interface circuit 225 (295) at a speed of 64 Giga-bit/second, which enables interface circuit 225

(295) to send 32 bytes of information forward or receive 32 bytes of information. The filters 106 of this disclosure are very flexible, insofar as they can be moved to filter a specific part of a packet. The filters 106 can be re-loaded by interface circuit 225 (295) as needed if there are multiple sub-packets. Additionally, interface circuit 225 (295) can apply a mask to set ranges of packets or addressees in packets and/or sub-packets. By grouping packets using greater than and less than operations, interface circuit 225 (295) can, for example, determine that when a packet has an address number from 15 to 29, that packet will be received. In some examples, binary masks can be applied, such that sub-packets having an address beginning with an even number, like 8-7, are forwarded, sub-packets having addresses beginning with odd numbers are not forwarded (at least not immediately). Thus, having a greater/less than operation for sub-packet address classification can be advantageous. In some examples, different filters such as 106 and 107 can be operationally combined with other components such as MAC 206 (266), 220 (290) to further process a packet by the packet's MAC address.

As noted, multiple filters can be combined for the interface circuit 225 (295) to make switching determinations. Additional logic can also be applied. For example, classifier 232 might classify a packet, and apply classification dependent logic, like 'for packet type A, if conditions one, two and three are true, then the packet will be received.' As another example, if a packet is classified as type B, if condition one is true and condition two is false, then the packet will be dropped. The subsystem 200 can be configured such that conditions can also include a time window in which a packet is received. For example, interface circuit 225 (295) could determine that at a certain point in time, the interface circuit 225 (295) will allow only very important (higher priority) input/output data to be forwarded. The interface circuit 225 (295) can be configured such that during a specified period (such as after a predetermined event has occurred), one set of filter combinations will be applied, whereas during other times all types of data traffic might be allowed. This described programmability is advantageous in industrial settings, as industrial communications operate based on hard time windows (in contrast to teleconferencing, for example.

In examples of this disclosure, multiple hardware filters can be combined with rate filters 107, such that data packets can be sorted according to rate as well. The filters 106, 107 and hardware 220 (290) operations used can be performed cumulatively. Packets can be filtered using any combination of content, time, and rate—all in real-time. A given filter 106 can be restarted multiple times for a packet. A filter 106 can have a start address whose value is determined, at least in part, on the content and/or type of content of a given packet/sub-packet.

In at least one example of this disclosure, interface circuit 225 (295) is configured to automatically detect whether a packet contains a virtual local area network (VLAN) tag. Some Ethernet packets have a tag for bytes of tag in the middle of a packet, or trailing a MAC address. It can occur that if a filter is applied to the data trailing the MAC address, the MAC address will be undesirably shifted by four bytes. Example interface circuits 225 (295) of this disclosure solve this problem by automatically detecting whether a packet has a VLAN tag, and if the packet does contain a VLAN tag, restarting the relevant filter 106 using the location of the VLAN tag as the start address. Thereafter, the interface circuit 225 (295) makes a determination, such as whether to receive or drop the packet using combinational logic, which can involve any appropriate combination of ANDs, ORs, and filter flags. In one or more examples of this disclosure, rate counters 107, which can be hardware rate counters, determines rates depending on the type of traffic in question and a predetermined time window for the packet's type. Thus, there can be a certain time for high-priority packets and a different time for non-real-time packets, and different filters can be applied depending on the situation. In some examples, filters 106 which yield immediate results during receive-time (on the fly) processing, will forward the packet in question regardless of the length of that packet. This operational capacity stands in stark contrast with that of conventional Ethernet, in which a packet is first received, one or more look up tables are consulted, and then a switching decision is finally made. In some examples of this disclosure, packet size is predetermined and communications occur at a fixed rate per packet. In other examples, information regarding packet length is contained within the header of the packet. In either case, packet length is determined in hard real-time on the fly.

At least one technical benefit of the architectures described in this disclosure is that they enable switching/forwarding determinations to be completed in a single microsecond, even for packets which have a length of up to twelve microseconds. The combinational logic of the interface circuit 225 (295) based on time, and data rate, enables the classification engine 232 to perform in a robust fashion. The ability of the subsystem 200 to restart a filter 106 to apply the filter 106 multiple times in a packet enhances the ability of the subsystem 200 to make packet switching decisions in real-time. In an example implementation, filter 106 which is limited in length. If a packet is longer than the filter, the filter 106 will need to be reloaded. If an Ethernet packet which contains sub-packets a filter 106 can be reused for multiple locations with the single packet. In some examples, sub-packets will each have their own address. If for example, a packet contains three subpackets, an address filter 106 can be loaded three times to apply the same address filter 106 to each sub-packet. PRU_0 219 writes data into TX_L2 via interface 252 (255), and the data then exits slice_0 201 along communications pathway 253. The real-time processing described supports the resource availability and allocation management which is described below.

Examples of this disclosure pertain to resource availability event messaging to real-time task managers (e.g., task manager circuit 223) for multi-core communication. At least one implementation of this disclosure is a system which efficiently manages resource sharing among multiple real-time tasks in a multi-core processing system for industrial communication. In at least example, a subsystem (e.g., subsystem 200) minimizes stall cycles typically associated with resource sharing, such as when a resource is currently unavailable, an associated hardware needing a task performed ends up polling for resource availability and wasting PRU cycles. In examples of this disclosure, such PRU cycles can be used for other real-time tasks, and when a resource becomes available a preempted task can be resumed. Thus, latency is reduced.

In at least one example, a task that a hardware component needs to have performed is pended onto an unavailable resource for 64 spinlock flags in real-time. When the resource becomes available, an event corresponding to the task manager (e.g., task manager circuit 209) is routed to task manager which then operates on the event and triggers the task which is waiting for the resource, depending on the priority of the task relative to other tasks. Multiple tasks can be pending on the same unavailable resource using spinlock 249 flags. In examples of this disclosure, critical tasks are performed immediately on resource availability and stall cycles are eliminated, thus making the best use of PRU cycles.

At least one example of this disclosure uses BS instruction of PRUs in a system (e.g., 200) having multiple PRUs. In at least one example, a real-time task manager (e.g., task manager circuit 209) with an interrupt dispatcher provides low latency task switching. The ability to enable multiple tasks to be pending for same resource, and to have latency task switches on resource availability minimizes stall cycles which would be present in conventional systems.

At least one technical benefit of examples of this disclosure is that the examples enable high speed Industrial Ethernet and similar PRU firmware to save PRU cycles by avoiding stalls when a computational resource is currently unavailable to one or more circuits because that computational resource is currently being used by one or more other circuits. Examples of this disclosure include hardware support enables PRU (e.g., 205) firmware to avoid polling for resource availability, which is non-deterministic. Increased system determinism enables switching gigabit Ethernet packets with fixed latency and minimal jitter. Examples of this disclosure thus optimize PRU cycle usage for resource sharing in a multi-core processing system (e.g., subsystem 200). In at least one example, 64 spinlock flags are used to avoid stall cycles which would be used to continuously poll for resource availability in conventional systems. In various examples, the firmware of a first hardware component (e.g., PRU 205) will check for resource availability for a task only once, and then the use of the desired resource will be yielded as another task for another hardware component (e.g., PRU_0 219) is performed. The pending task will be re-triggered by real-time task manager (e.g., task manager circuit 209) when the resource is free for use by the waiting hardware component (e.g., PRU 205).

Examples of this disclosure pertain to the interoperability of PRU task managers (e.g., task manager circuit 112) with a spinlock circuit (e.g., 249) to manage access to shared resources (see FIG. 2B generally). Such task managers (e.g., 209) will, in most instances, operate in real-time. In various examples, to be able to operate at gigabit Ethernet speeds, FW of the task managers (e.g., 223) utilize registers. To accommodate different tasks, such as involved in packet switching (e.g., packet receive, transmit and background tasks like source address learning), task managers are configured to switch between mechanism is required. Working with the spinlock circuit 249, a task manager circuit (e.g., 223) will preempt a current PRU execution/task, save off key registers and start a new task that has a higher priority than the current task within ten nanoseconds after a hardware event triggering the new task. In one or more embodiments, firmware maps which one of a plurality (such as 64 or 70) of hardware events should cause the task swap to occur since task managers will be configured to respond to different hardware events and can prioritize tasks differently, which enables tight real-time task swapping that is optimal for a given task manager (on behalf of the task manager's respective PRU). Connections 150, 152, 154, 156, 158, 160, 162, 164, 252, and 255 are broadside connections. Connections 150, 152, 154, 156, 158, 160, 162, 164, 252, and 255 each include at least one broadside interface. These broadside interfaces enable 32-bytes of memory to be transferred across the interfaces in a single clock cycle.

Figure 3:
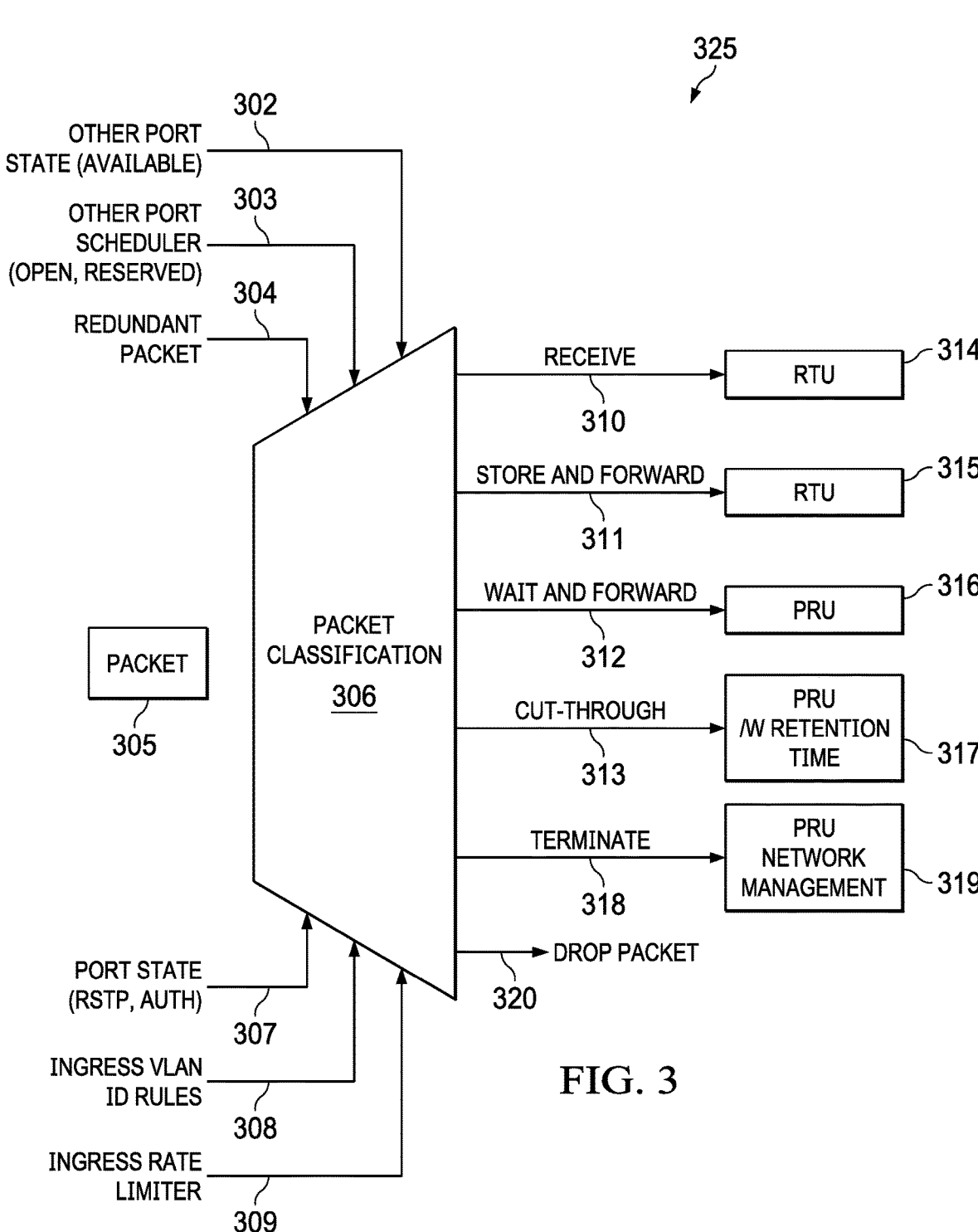
FIG. 3 illustrates a block diagram describing the logic of a packet classification engine in accordance with an example of this disclosure.

FIG. 3 illustrates a block diagram describing the logic 300 of a packet classification engine 306 (108, 232, 232') in accordance with an example of this disclosure. In FIG. 3, a representative data packet 305 interacts with packet classification engine 306 (108, 232, 232') of interface circuit (225). Packet 305 (which would under normal operating conditions be one packet in a stream of packets) is received at FIFO 301. Depending on the port state 307, on time, on certain address rules 308, on rate limitations 309, different outputs 310, 311, 312, 313, 318 and 320, are produced. For example, the packet 305 can be received 310 or stored and forwarded 311. Packet classification engine 306 can determine that the packet 305 should be forwarded 312 after a waiting period, such as when the port (225) is busy on the other side (118, 119). Alternately, the classifier 306 could immediately send 313 the packet 305 to the other side (118, 119), which can involve a network management operation called a cut-through 313. In a cut-through operation, the packet is processed directly by the PRU 317 (219). Alternately, the classifier 306 can determine that the packet 305 should be dropped, such as when the packet 305 is not addressed to any addresses with which the FIFO 301 is coupled.

As noted, when a packet 305 is received it will be inspected and/or will be compared against different rules (308, for example). Other port state 302 refers to whether a particular Ethernet port (225) or an Ethernet interface (225') is in an open state or a closed state. If the value of input 302 is 'true' or '1', that can mean that the Ethernet port or ethernet interface is connected to an external signal source. If the value of input 302 is 'false' or '0', that can correspond to an indication that Ethernet port or Ethernet interface is not connected to an external signal source. Alternately, the value at input 302 can be an indicator to the classification engine 306 (108, 232) for the classification engine 306 to enter a state in which the classification engine 306 only allows a certain type of ticket, such as for security reasons. For example, if an external source wants to talk to this device (200) when the classification engine 306 is in a secure configuration, the classification engine 306 will only accept a data stream from that source if the first packet 305 that the classification engines is a security packet containing proper authentication information. In that situation, the value at input 302 would be switched to 'high' or 'true', and the receiver circuit 225 would be switched to normal operation as a result. There are different port states 302-304, 307, which can be factors during packet classification 306. For example, if interface circuit 225 receives a non-secure packet when interface circuit 225 is set to be secure, then classifier (232) would drop the non-secure packet as indicated in item 320. As noted, FIG. 3 illustrates that packet classification 306 is also driven by a number of rules such as ingress virtual local area network identification (identifier) (VLAN ID) rules 308. An ID can be a tag, a number, an address or a group of addresses.

Item 303 is a port scheduler which is reserved open. Forwarding decisions in a cut-through manner can only be done if the forwarding port/other port is open and not blocked by a packet. Other port scheduler can also block packets from current port in case of up-coming boundaries such as red and green communication phases. For example, if a packet 305 is received at a first port (RX_L1 227A, for example), but the packet should have gone to a different port (RX_L1 227A, for example), then the value at input 303 would be 'high.' Within this disclosure, an interface circuit (225) always has at least two physical ports. Give and receive on port 1 and let's assume if packet is supposed to go on port 2, that's what they call in item 3 other port scheduler. For the interface circuit (225) to forward misdirected packet to another (correct) port, the classification engine (232) must determine whether other (correct) port has a port available or whether that (correct) port is closed. If the other port is open, the classifier (232) could perform a cut-through 213. In examples of this disclosure, when a packet 305 is received, the classifier (232) can check the length of the packet once the packet 305 is fully loaded. The packet 305 is forwarded to PRU (219) which can perform a cyclic redundancy check (CRC) 221. The PRU will then check the CRC 221. The CRC determines whether the packet 305 should be received 310. The PRU (219) then makes a decision as to whether the packet should be stored and forwarded 311. The above-described operation can be called a store and forward operation 311.

In at least one example, the classifier (232) looks at the first byte of an incoming packet 305 to see whether the packet 305 needs to be forwarded or received 310 or both. The classifier (232) looks up the header. After the classifier (232) has looked up the header the process of forwarding the packet 305, even though the packet 305 has not been fully received. The fact that the packet 305 has not been fully received means that the end of the packet 305 has not been received and has not been examined. The forwarding processes can begin even though the classifier (232) has not seen the end of the packet, even though the length of the packet 305 is not yet known, and even though a CRC 221 check has not been performed. The above-described process of forwarding a packet based on the first byte of data is called a cut-through operation 313. In one or more examples of this disclosure, cut-through 313 is performed in real-time.

Continuing with the classification architecture 300 illustrated in FIG. 3, item 304 means that a received packet 305 and has been classified as a redundant packet 305. In at least one example, if there is a network and there are two ports through which a packet 305 can be sent, the packet 305 could be sent using whichever side (port) is available. In that case, a circuit which receives that redundant packet would pick the first (receive 31) the first packet 305 and drop 320 second one.

In FIG. 3, item 307 is a port state. Different port states 307 are possible. One such port state 307 is rapid-spanning tree protocol (RSTP) which would mean that the received packet 305 is formatted according to the RSTP. Rapid Spanning Tree Protocol (RSTP) can block incoming packets based on Ethernet address information. The protocol of a packet 305 defines the path of that packet through a network (200). Sometimes, if the path indicated for a given packet 305 is not correct, the packet 305 will be dropped 320. If, on the other hand, the path is defined for a given packet 305 then the packet will be processed and received 310 or forwarded 311 to RTU 315. Item 308 refers to ingress virtual LAN identifier rules. In at least one example an area in a network can be defined. For example, there might be ten computers available, however it is desirable to group three of the ten computers into one subnetwork. The subnetwork will be assigned a VLAN ID. When a packet 305 does not bear that VLAN ID (does not comply with a VLAN ID rule 308), that packet 305 can be dropped 320.

Item 309 in FIG. 3 is an ingress rate limiter. A packet of a specific type, like a specific header can be limited as to what rate it can be processed. The ingress rate limiter 309 helps to ensure that processing of more important packets 305 is not blocked by processing less packets 305. The ingress rate limiter 309 takes a count of the header of a packet 305, identifies the header to be of a certain type, and then limits the number of packets 305 of that type which will be received at the port (253) for a determinate period. Thus, the ingress rate limiter 309 will prevent many packets of a given type from being received in a given time frame. In at least one example, excess packets 305 which are excluded by the ingress rate limiter will be dropped 320.

In at least one example, the output decision of the packet classification 306 is to receive 310 the packet 305 and send (via interface 252, for example) the packet 305 to RTU 314. In at least one example, the packet 305 is received 310 through an RTU 314 block. As described above, RTU 314, 315 is a processor of ICSS (200). RTU can also be called a PRU (219) and an AUX_PRU (205). It should be noted that while RX_L1 and RX_L2 (see 105 in FIG. 1 and 227 in FIG. 2A) are input ports through which receiver circuit 225 receives packets 305, RX_L2 227B can also be a filter of RX classifier block 232.

Returning to the discussion of FIG. 3, received packets 305 can be received 310 to the RTU 314 for processing. Item 311 refers to storing and forwarding 311 the packet 305 to the RTU 315. Storing and forwarding 311 means that a packet 305 is received 310 completely and then put into a buffer (not shown). Thereafter the packet 305 is forwarded from the buffer (not show) to the other port (TX_L1 226A, for example). Item 312 is a possible decision resulting from packet classification 306. Process 312 is a hybrid process. For example, receiver circuit (225) might receive a 1,500-byte packet, (which is a large Ethernet packet.) When performing a store and forward operation 311, the interface circuit 232 will need to wait for 1,500 bytes to be correct in size and have a correct checksum 222 before the packet can be processed and before a decision to forward the packet can be made (meaning the receive time is variable). On the other hand, a cut-through 313 is performed at a fixed time 317 after sufficient information has been received to be able to forward the packet while the packet is being received. In cut-through 313 front end of the packet 305 is sent out while the back end of the packet 305 is still coming in (253). In contrast, in the wait and forward mode 312, the 1,500-byte packet which would otherwise be processed in a cut-through mode will, if the necessary port is busy, instead be fully received and then forwarded through an available port.

Figure 4:
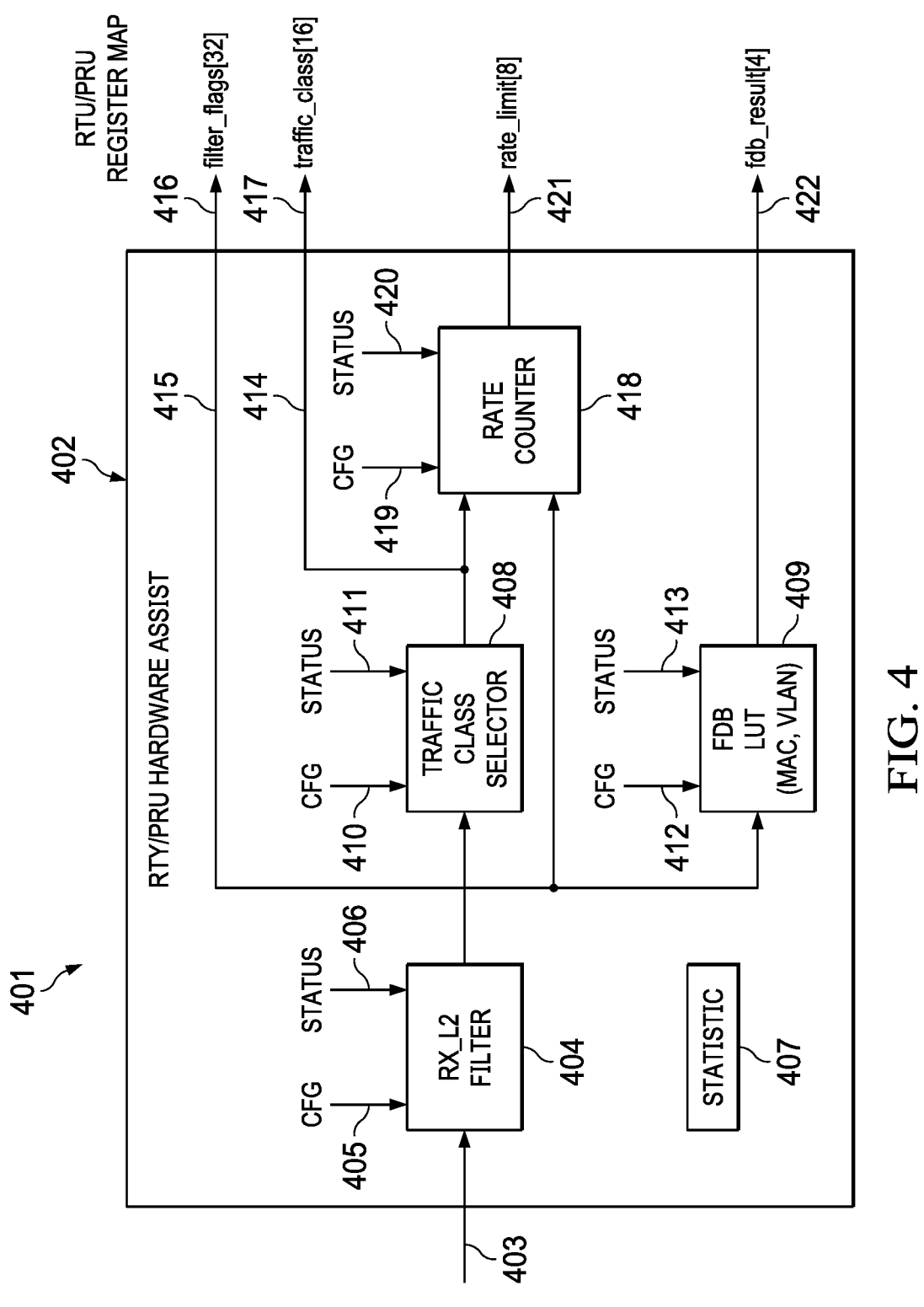
FIG. 4 illustrates a block diagram of an implementation of a packet classification engine in accordance with an example of this disclosure.

Item 318 in FIG. 3 indicates that a decision has been made by the interface circuit (225) to terminate a packet 305, and thus, the packet 305 is processed inside the PRU 319 (219). Such packets 305 can be termed network management packets. For example, a packet carrying time synchronization instructions for the PRU 319 would be executed by the PRU but need not be sent to the host CPU (262) and not forwarding to another port (TX_L1, for example). Block 319 indicates the terminated packet contains PRU code which is handled by the PRU (219) as part of network managements. The left side FIG. 3 illustrates the series defining some states, defining features such as different forwarding receiving or drop packet. FIG. 4 illustrates implementation hardware blocks that provide this capability.

FIG. 4 illustrates a block diagram of an implementation of a packet classification engine 402 in accordance within an example FIFO 400 (105, 227B). FIG. 4 provides a simplified view of the hardware 401 of classification engine which, as discussed at length, includes filters 404. FIG. 4 shows an example implementation of hardware blocks configured to provide the operational capabilities discussed regarding FIG. 3.

In the example implementation of FIG. 4, a packet 403 (305) enters RX classifier 402 (232) via RX_L2 filter 404. (As noted RX_L2 is both receiver and a filter.) RX_L2 filter 404 can look up packet 403's type in filter data base (251). RX_L2 filter 404 can go into any location inside the packet 403 without having to start reading at the first byte of the packet 403. In some examples, RX_L2 filter 404 can also go to the end of a packet 403 and compare the packet 403 to a fixed data pattern which is prestored from the host CPU 262 in that RX_L2 filter 404.

In some implementations of ICSS 200, there are twenty-four RX_L2 filters 404 per slice (201, 261). A slice (see FIG. 2A) is a side portion of an ICSS 200 which shares components (see FIG. 2B) with another side portion (see FIG. 2C) of the same ICSS 200. A slice (201) describes one bi-directional component through which the ICSS 200 communicates on a first port (253). A slice (201) includes a programmable logic unit (PLU) to be able to receive data. The PLU 225 transmits on the other port (TX_L2, for example). Thus, the receive-transmit communications (RXT) along one pathway is called one slice, and there is at the same time a communication in the other direction 253' at PRU 225. PRU 225 is the Ethernet port for slice0 (see FIG. 2A). Unlike conventional SoC's, in at least one example of this disclosure, one Ethernet port (for example, 225) can interact with a far device using an Ethernet protocol, while at the same time the other Ethernet port (for example 225') is used to control one or more slave devices. In at least one alternate example, one Ethernet port (for example, 225) can interact with a far device using an ether net protocol, while the other Ethernet port (for example 225') is connected to the first slice of another ICSS in a daisy chain fashion. In at least one implementation of a daisy chain arrangement there is a multiplexer (not shown) interposed between PRU 225 and PRU 225', such that some data which enters slice0 201 via pathway 253 passes through the multiplexer (not shown) before exiting slice1 261 via pathway 253'.

Ethernet data 403 (305) is passed into filter 404 (106). When data goes through the FIFO 400, filters (for example, 404) are applied in real-time. The packet (305) then goes to traffic class selector 408, which determines what type of traffic the packet 403 is, based on the combination of filters 404 that were applied to the packet 403. Additionally, the FIFO 100 can apply a rate limitation to the packet 403 depending on the type as determined by class selector 408. In at least one example, a class selector 408 can be configured to select from different groups of classifications, depending on various factors, such as when the packet 403 arrives. For example, if the packet is received at a critical time, then an applied classification could be drawn from possible classifications 1 through 8. Alternately, if the packet is received at a non-critical time, such as when the system 200 is not operating in real-time, selector 408 could draw from classifications 9 through 16.

As noted, in FIG. 4 a packet (305) enters 403 classification engine 402 (232) at RX_L2 filter 404. Also as noted, RX_L2 filter 404 contains twenty-four hardware filters which examine the packet 305 and giving a restart where the comparison of the filters with the incoming packet is a match or not. For example, a first level of classification could consist of identifying the third packet type by comparing the incoming packet 305 with the RX_L2 filter. The above classification method is a classification of content by data comparison, which can be as simple as determining that a packet which belongs to a virtual LAN ID. Alternately, RX_L2 could determine that while a given packet (305) has a properly matched address, the packet could still be filtered base on the packet's content.

When the packet (305) has passed through filter 404 the packet is forwarded to FDB 409. FDB 409 performs a lookup in a look up table (LUT). FDB 409 can be a file transfer protocol (FTP) filtered database. FDB can consult an LUT and look at the first 14 bytes of an ethernet packet which include the packet's MAC (media access control)

field and the packet's VLAN field. Consulting those two fields provides a wider view of the packet. The MAC and the VLAN are received or forwarded 422. One difference between filter 404 and FDB 409 is the number of comparison operations each can make. In filter 404 can have up to 24 filters, whereas FDB can store thousands of addresses which must be compared against a received packet using a hash-based index lookup into a bucket of up to 8 entries. The word capped is unclear to me.

After a packet clears filter 404, in addition to going to FDB 409, the packet goes in parallel to a traffic class selector 408 and to rate counter 418. Traffic class selector 408 classifies the packet according to its type. Once the traffic class selector 408 has identified a certain packet type, the type of the packet can be associated with a certain data rate. The traffic class selector 408 determines if the type of packet exceeds a data rate threshold, which for an example gigabit network could be 200 megabits. If one gigabit is to be specific type of packet, then if the packet 403 exceeds the rate limit the RX classifier 402 can may drop that packet 403. Traffic class selector 408 classifies data 403 by data rate. The output of traffic class selector 408 is sent to rate counter 418 in parallel with the output of RX_L2 404. The output of RX_L2 404 and the output of traffic class selector 408 concern the same packet 403. In at least one example, traffic class selector 408 and RX_L2 filter 404 are combined.

In at least one example, one of the twenty-four filters in RX_L2 filter 404 filters on the first 6 Bytes of a packet 403 which is the destination address of an Ethernet device. Another one of the filters in RX_L2 filter 404 might indicate that the packet 403 is of a certain protocol. For example, the packet 403 could be an IP packet and the classifier 403 could insert a filter which indicates that the packet 403 has VLAN ID. In order to make the above-referenced combination the classifier 402 needs to have the MAC address of the packet 403 and the classifier needs to be able to identify which VLAN ID the packet 403 must have in order to identify the packet 403 as an IP packet. The traffic class selector 408 can be programmed with the three conditions described. If the traffic class selector 408 determines that these three (example) conditions are true, then the class selector 408 will group the packet 403 with another packet which meets the same three conditions. Alternately, the traffic class selector 408 can give the packet one traffic class 417. In that instance, output 117 would indicate that the three conditions are matched and the packet 403 is one of the possible sixteen types 417 determinable by the classifier 402. As shown in FIG. 4, the traffic classification 424 can go into the rate counter 418. In the example described, the rate counter 418 counts the data rate only for those packets 403 which meet the three criteria imposed by RX_L2 filter 404 and traffic class selector 408. MAC address, the VLAN ID and the IP packet type account only the rate for that type. 408 traffic class selector selects by packet content such as MAC address, VLAN ID or IP address. The content-classified packet can be combined with the rate counter for such classified packet. (See 408, 418.) Conversely, if only one filter is applied at RX_L2 filter 404 and the packet 403 goes directly into rate counter 418, then the rate counter 408 will only count the rate for the one classification of the packet 403 that was determined by RX_L2 filter 404. Thus, classifier 402 can have a single classification via a single filter, or classifier 402 can combine multiple filters and make execute a traffic class selection function at traffic class selector 408.

One possible output of the classifier 402 is the filter flag output 416. A shown, there are up to 32 filter flags from the twenty-four programmable filters of RX_L2 filter 404 and eight hardware pre-defined filters (not show). A flag 416 indicates that the packet 403 is a certain packet type such as a unicast packet or a multicast packet which is identified by a single bit in the header. For example, a unicast packet would be going to one address whereas a multicast packet would go to all devices in the network in which the ICSS 200 resides, which is why there are 32 filter flags. Output 417 corresponds to a traffic class. Classifier 402 makes a selection of different filter settings and combines them, and the classification is output at 417. Output 421 comes from rate counter 418. The rate counter can be configured to count the rate for packets having the classification determined by RX_L2 filter 404 and traffic class selector 408. The rate is measured and limited depending on the traffic class selected for the packet 403 in question. Output 422 corresponds to filter database 409 results of a lookup in a wider lookup table storing thousands of addresses stored. As noted the FDB 409 compares an incoming packet 403 with the big lookup table (LUT) containing information about forward-received offset packets.

As illustrated in FIG. 4, classifier 402 outputs 416, 417, 421 and 422 go to the PLU (219). The PLU (219) reads in these classifier (232) outputs (416, 417, 421 and 422) and makes a final decision regarding whether the 403 (305) packet is dropped, received, forwarded, placed in a cut through mode, or going to a store in forward mode to the other port 253' (see FIG. 2C). Statistic block 407 tracks such statistics as how many bytes have been received within a certain period, how many packets 403 have been received, how many packets of a certain size have been received, and how many errors were detected in the incoming packets 403.

Figure 5:
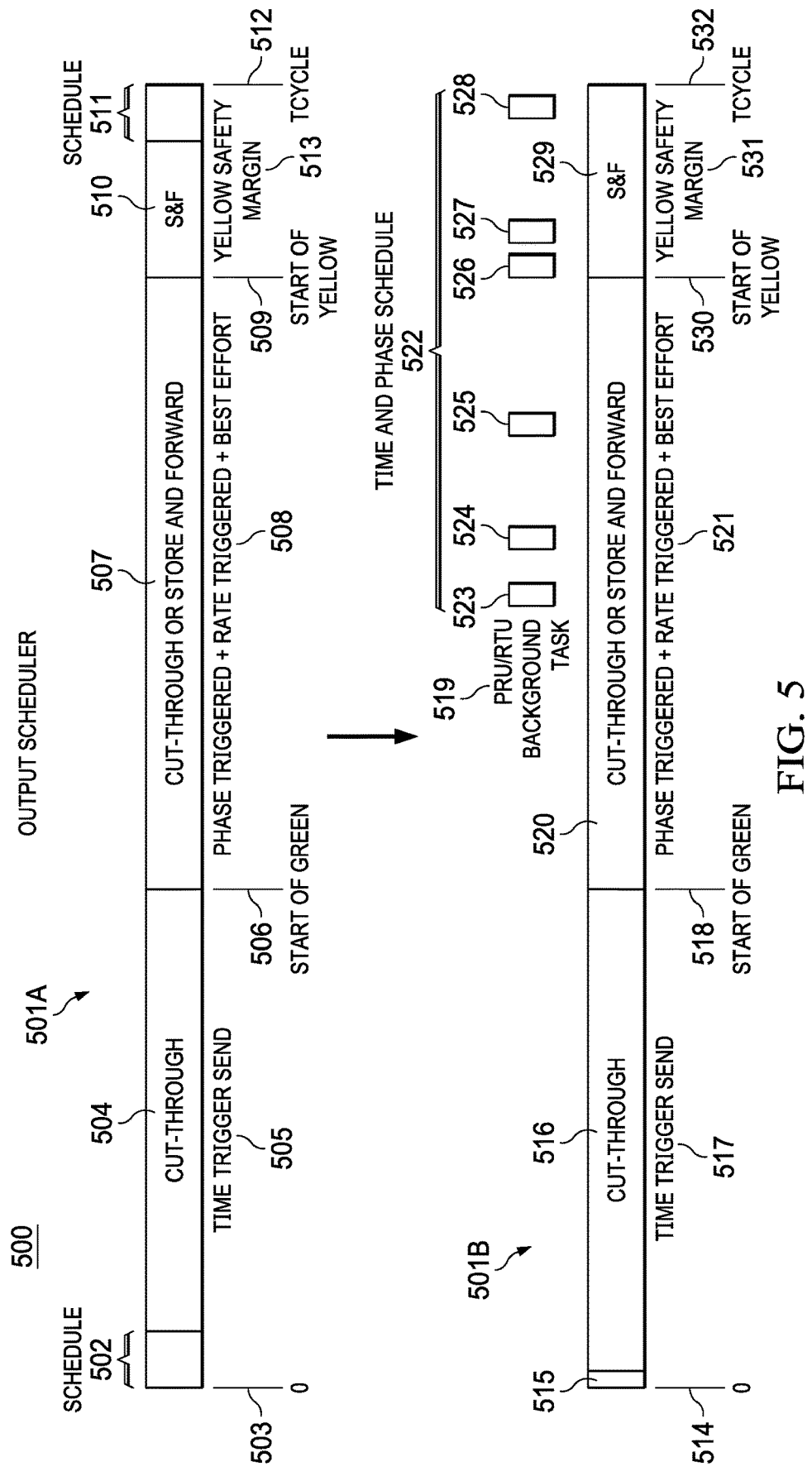
FIG. 5 illustrates aspects of an output scheduling module in accordance with an example of this disclosure.

FIG. 5 illustrates aspects of an output scheduling module 500 in accordance with an example of this disclosure. FIG. 5 illustrates communication phases of slice0 (201) and/or slice1 (261). Phase 504 is a phase in which packets (305, 403) are processed in a cut through mode. At the end of phase 504 there is a time 506 when slice0 (201) switches to the green phase 507, during which a packet can be processed in a cut through mode or a store-and-forward mode, as shown. At time 509 slice0 enters a yellow phase 510 during which all received packets are processed in a store-and-forward (S&F) mode. In period 502 and period 511 slice0 (201) does not send any packets because slice0 (201) must engage in scheduling operations. During scheduling in periods 502 and 511, the classifier (232) does not process any packets. Depending on time (phase), packets are processed differently. While FIG. 5 primarily illustrates cut through and store-and-forward processing, other processes are included within this disclosure. The packet classifier (232, 402) puts some types of packets into one phase (504, 516 for example) and other types of packets into a different phase (such as 508, 521). FIG. 5 illustrates an example of the property of the ICSS (200) that packets which are classified as more important are handled earlier (504, 516) in a cycle 501A, 501B than less important ones (507, 520).

FIG. 5 shows a critical period 504 and a non-critical period 507 within an execution cycle of the scheduling module 500 (in accordance with interface circuit 225, for example). In at least one example of this disclosure, a typical minimum cycle time is 31.2 microseconds. Before the scheduler 500 can enter a new red phase 516 in which the scheduler 500 attends to critical packets, the scheduler 500 prepares 511 for the transition from a non-critical period 507 to the next critical period 516. In industrial implementations it is important that critical packets be handled in accordance with one set of imperatives (rules), and that non-critical packets be handled in another. For example, it would be detrimental if non-critical packets were granted cut-through 504 (313) privileges while critical packets are delayed (312). Thus, time 503, 506, 514, 518 is a factor in packet classification (306). Timing drives whether the phase is a red phase 504, 516 or a green phase 507, 520, and a different type of classification scheme is applied according to the phase.

For the classifier (323, 402) to determine when to send out a packet and in which switch method, the classifier must look up the content of the packet. The packet classifier classifies a packet and based on the classification, the packet classifier (323, 402) saves the packet, or forwards the packet (305) in a cut through mode 504, 516 during green phase or red phase 507, 520, respectively. At the end 509, 530 of the green phase 507, 521 if a packet needs to be sent it is necessary for the packet to be completely received for the ICSS (200) to determine whether the packet fits into the yellow window 510, 529. If the packet does not fit the yellow window 510, 520, the packet is not sent during the communication cycle, (for example, cycle 501A, which runs from time-T0 503 to time-Tcycle). Instead the packet would be sent in the next communication cycle which runs from (for example, cycle 501B, time-T0 514 to time-Tcycle). This pattern 500 of sending packets repeats with every T-cycle. In at least one example of this disclosure, each cycle 501A, 501B is one millisecond long. For rate-triggered sends 508, 521, and best effort sends 508, 512, a real-time determination must be made by the classifier (322).

There is overhead associated with the phases 501A, 501B shown in FIG. 5. For example, if the classifier is operating in a 32-bit mode, then there will be a wrap around and the interface circuit 225 will need recalculate a new schedule time, because relative time available is available in a 32-bit mode, whereas when the interface circuit 225 is running in a 64-bit mode there is no wrap around. The time when to send a packet on egress port must be recalculated. In a 32-bit mode of an IEP there is a timer wrap around every few seconds. In a 64-bit mode there is no timer wrap around. If there is no wrap, then there is no scheduling overhead 502, 504 because scheduling operations are not necessary when the interface circuit 225 is operating in the 64-bit mode. Cycle 501A is an example cycle for an interface circuit 225 operating in relative time (32-bit mode), in which there is a wraparound (502, 511) during which timings are recalculated. Timings are recalculated because during phase 504 each time triggered packet (a packet with a designated send time) is sent 505. Cycle 501B is an example cycle for an interface circuit 225 operating in non-relative time (64-bit mode). The output schedule 500 of FIG. 5 is set by PLU 219 of FIG. 2A and IEP timer zero (IEP0) 241 of FIG. 2B. IEP0 generates an event when a packet is sent, when PRU 219 enters a red phase (critical phase) 504, 516, and when PRU 219 enters a green phase (non-critical phase) 507, 520.

Figure 6:
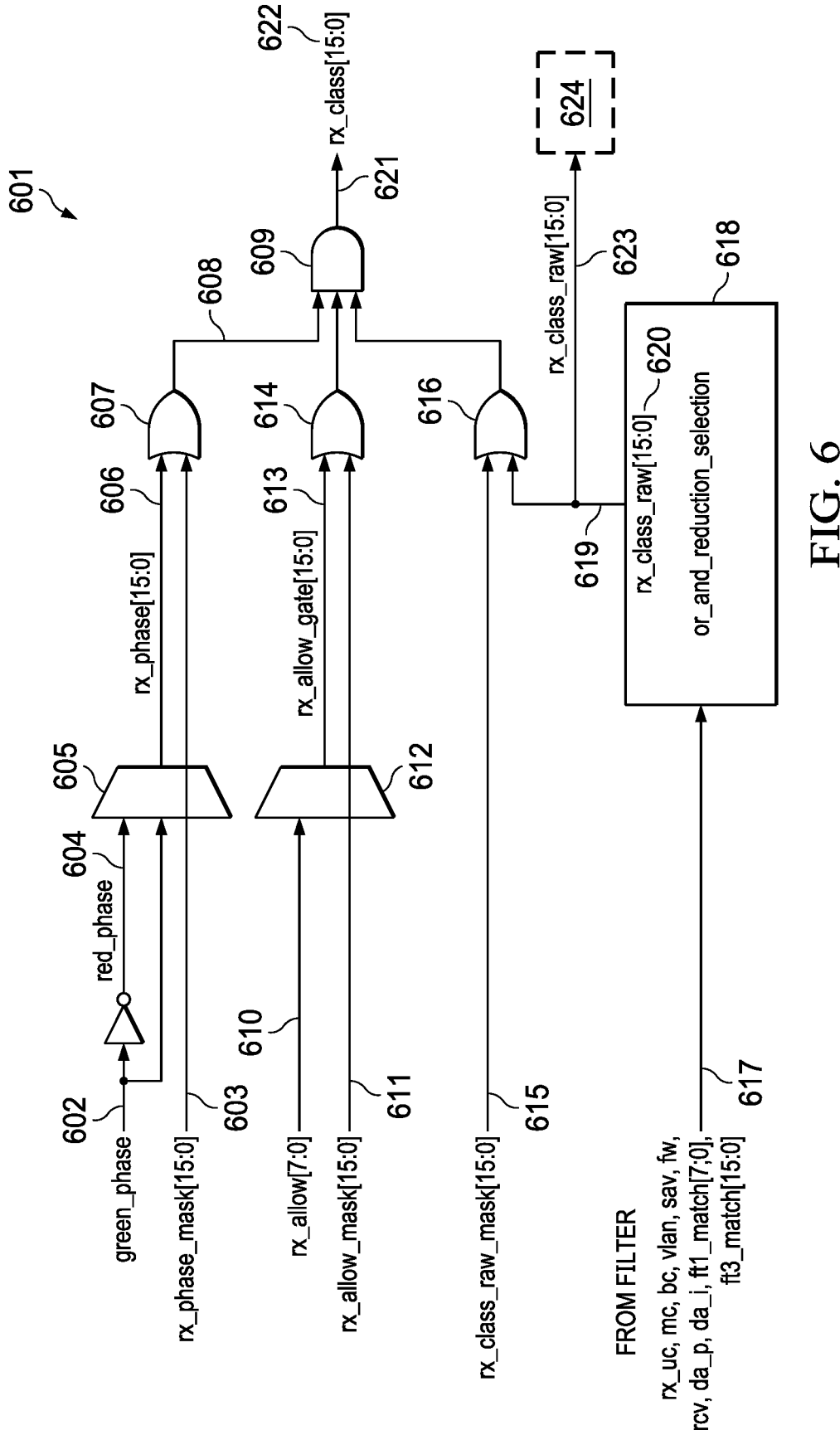
FIG. 6 illustrates an operational flowchart of a packet classification engine in accordance with an example of this disclosure.

FIG. 6 illustrates an operational flowchart 600 of a packet classification engine 601 in accordance with an example of this disclosure. In FIG. 6, red time information 604 and green time information are shown entering classification hardware 601 (322, 402) which generates classification output 621 (see 417, FIG. 4) corresponding to a classification determined for a packet (305). Block 609 corresponds to traffic class selector 408 of FIG. 4. Input 602 represents information about time, indicating the classifier 601 is in the green phase. Input 602 comes from an IEP timer, such as IEP0 241. Depending on the value of input 602, the classification hardware 601 will be in a green phase 602 or red phase 604 of a communication cycle (501A, 501B). Input 617 is output (415) from RX_L2 filter (404). At block 618, classifier 601 can perform a reduction of the information 617 coming from RX_L2 (404).

As illustrated in FIG. 6, classification engine 601 can create a combination of different conditions for a packet (305). The classification engine 601 can then associate this combination of different conditions to an output signal 623 corresponding to one of sixteen traffic classifications 620. The RX_L2 (404) gives an output 617 based on the content of the RX_L2 (404). As shown, this output terms such as 'FT1 match', (filter type 1 match) which is derived from the first 12 bytes of an ethernet packet and determining whether the packet matches any of the settings [7:0] of RX_L2 (404). If the packet (305) matches then the classifier 601 will classify the packet—there can be up to sixteen classifications [15:0]. In addition to looking at the content of the packet, the classification engine can 'RX allow' 610 the packet. The RX allow signal 610 come from the rate counter (418). Item 620 defines certain traffic and certain content of a packet. The content is combined with the data rate of that specific packet which is an RX allow 610. Thus, the output 622 of the classifier 610 is a combination 609 of content and data rate. The input to AND gate 609 comes from OR gate 607, OR gate 614 and OR gate 616. Signal 608 corresponds to time information about the packet (305). The output 621 from gate 609 can include the time at which the packet was received, the rate at which it was received, and the content-based classification of the packet.

The raw RX classifier 624 does not receive the combination of data rate and time of 622. Raw RX classifier 624 receives only the raw data classification 632 from block 618. Whereas RX class output 622 is the data classification plus the data rate plus the time. The output signal 621 corresponds to signal 417 of FIG. 4, however output signal 621 also encompasses the rate limit 421 (not shown in FIG. 6). Input signal 602 is a time-based classification. Input signal 610 corresponds to rate limit 421 from rate counter 418 in FIG. 4. Input signal 615 and input signal 617 represent content-based classifications.

While an SoC is primarily used throughout the above disclosure as an example type of chip, it will be appreciated that the techniques described herein may be applied in designing other types of IC chips. For instance, such IC chips may include a general-purpose or application-specific (ASIC) processor based upon x86, RISC, or other architectures, field-programmable gate array (FPGA), graphics processor (GPU), digital signal processor (DSP), a system-on-chip (SoC) processor, microcontroller, and/or related chip sets. By way of example only, the IC chip may be a model of a digital signal processor, an embedded processor, a SoC, or a microcontroller available from Texas Instruments Inc. of Dallas, Texas.

Certain terms have been used throughout this description and the claims to refer to particular system components. As one skilled in the art should appreciate, different parts may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A device comprising:
a network interface circuit configured to receive a packet that has a set of attributes that includes a time at which the packet was received;
a packet classifier circuit coupled to the network interface circuit; and
a set of processing units coupled to the packet classifier circuit, wherein the packet classifier circuit is configured to determine, based on the set of attributes:
whether to, during a communication cycle divided into a plurality of intervals including a first interval and a second interval that occurs after the first interval, cause the network interface circuit to begin to provide the packet to the set of processing units during the first interval prior to the packet being completely received by the network interface circuit and if a port is available, or to cause the network interface circuit to wait to provide the packet to the set of processing units during the second interval after the packet is completely received and if a port is available.

2. The device of claim 1, wherein the set of attributes includes an addressee of the packet.

3. The device of claim 1, wherein the set of attributes includes a rate at which the packet was received.

4. The device of claim 1, wherein the packet includes a header that specifies a subset of the set of attributes.

5. The device of claim 1, wherein the packet is an Ethernet packet.

6. The device of claim 1, wherein:
the first interval corresponds to a critical period of the communication cycle; and
the second interval corresponds to a non-critical period of the communication cycle.

7. The device of claim 1, wherein the plurality of intervals further includes a third interval that occurs before the first interval, the third interval being a scheduling interval during which the network interface circuit does not provide the packet.

8. A device comprising:
a network interface circuit configured to receive a packet that has a set of attributes;
a packet classifier circuit coupled to the network interface circuit; and
a set of processing units coupled to the packet classifier circuit, wherein the packet classifier circuit is configured to determine, based on the set of attributes whether to cause the network interface circuit to begin to provide the packet to the set of processing units prior to the packet being completely received by the network interface circuit; and
a scheduling circuit coupled to the packet classifier circuit and configured to define:
a first time phase during which the packet is permitted to be provided by the network interface circuit prior to the packet being completely received;

a second time phase during which the packet is permitted to be provided by the network interface circuit prior to or after the packet is completely received; and a third time phase during which the packet is permitted to be provided by the network interface circuit after the packet is completely received.

9. The device of claim 8, wherein the set of attributes includes at least one of: a time at which the packet was received, an addressee of the packet, or a rate at which the packet was received.

10. A device comprising:

a network interface circuit configured to receive a packet that has a set of attributes that includes a time at which the packet was received; and a packet classifier circuit coupled to the network interface circuit and configured to couple to a processing unit, wherein the packet classifier circuit is configured to determine, based on the set of attributes:

whether to, during a communication cycle divided into a plurality of intervals including a first interval and a second interval that occurs after the first interval, cause the network interface circuit to begin to provide the packet to the processing unit during the first interval prior to the packet being completely received by the network interface circuit and if a port if available, or to cause the network interface circuit to wait to provide the packet to the processing unit during the second interval after the packet is completely received and if a port is available.

11. The device of claim 10, wherein the set of attributes further includes at least one of: an addressee of the packet or a rate at which the packet was received.

12. A method comprising:

receiving a packet at a network interface circuit, wherein the packet is associated with a set of attributes that includes a time at which the packet was received;

determining, based on the set of attributes and within a communication cycle divided into a plurality of intervals including a first interval and a second interval that occurs after the first interval, whether to begin to provide the packet, by the network interface circuit to a processing unit, during the first interval before the packet has been completely received by the network interface circuit and if a port is available, or to wait to provide the packet, by the network interface circuit to the processing unit, during the second interval after the packet is completely received and if a port is available; and providing the packet, by the network interface circuit, to the processing unit.

13. The method of claim 12, wherein the set of attributes includes an addressee of the packet.

14. The method of claim 12, wherein the set of attributes includes a rate at which the packet was received.

15. The method of claim 12, wherein the packet includes a header that specifies a subset of the set of attributes.

16. The method of claim 12, wherein the packet is an Ethernet packet.

17. The method of claim 12, wherein:

the first interval corresponds to a critical period of the communication cycle; and the second interval corresponds to a non-critical period of the communication cycle.

18. The method of claim 12, wherein the plurality of intervals further includes a third interval that occurs before the first interval, the third interval being a scheduling interval during providing the packet is not performed by the network interface circuit.

19. A method comprising:

receiving a packet at a network interface circuit, wherein the packet is associated with a set of attributes;

determining whether to begin to provide the packet, by the network interface circuit to a processing unit, before the packet has been completely received by the network interface circuit based on the set of attributes;

defining:

a first time during which the packet is permitted to be provided by the network interface circuit prior to the packet being completely received;

a second time during which the packet is permitted to be provided by the network interface circuit prior to or after the packet is completely received; and a third time during which the packet is permitted to be provided by the network interface circuit after the packet is completely received; and providing the packet, by the network interface circuit, to the processing unit.

20. The method of claim 19, wherein the set of attributes includes at least one of: a time at which the packet was received, an addressee of the packet, or a rate at which the packet was received.

* * * * *